US008992301B2

(12) United States Patent
Caputo et al.

(10) Patent No.: US 8,992,301 B2
(45) Date of Patent: Mar. 31, 2015

(54) GAMING SYSTEM AND METHOD FOR PROVIDING A GAME WHICH POPULATES SYMBOLS ALONG A PATH

(71) Applicant: IGT, Reno, NV (US)

(72) Inventors: Scott A. Caputo, Santa Clara, CA (US); Leandro Basallo, San Francisco, CA (US); Rachael A. Bristol, San Francisco, CA (US); Thomas Uster, San Francisco, CA (US); Jodi Manela, Walnut Creek, CA (US); Dacotah Petermann-Turner, Oakland, CA (US); Amity Wang, Fremont, CA (US); Benjamin J. Zoltewicz, Mill Valley, CA (US); Prashant Arora, Mountain View, CA (US); David Hernandez-Diaz, San Francisco, CA (US); Stephen J. Edwards, Walnut Creek, CA (US); Matthew Falzone, San Francisco, CA (US); Sean Mountain, San Carlos, CA (US); Alexander Present, Berkeley, CA (US); Todd Wong, San Mateo, CA (US)

(73) Assignee: IGT, Las Vegas, NV (US)

( * ) Notice: Subject to any disclaimer, the term of this patent is extended or adjusted under 35 U.S.C. 154(b) by 170 days.

(21) Appl. No.: 13/628,930

(22) Filed: Sep. 27, 2012

(65) Prior Publication Data

US 2014/0087828 A1 Mar. 27, 2014

(51) Int. Cl.
*A63F 13/00* (2014.01)
*G07F 17/32* (2006.01)

(52) U.S. Cl.
CPC ............ *G07F 17/32* (2013.01); *G07F 17/3213* (2013.01); *G07F 17/326* (2013.01)
USPC .................................. 463/20; 463/16; 463/42

(58) Field of Classification Search
USPC ................................................ 463/16, 20, 42
See application file for complete search history.

(56) References Cited

U.S. PATENT DOCUMENTS

| | | | |
|---|---|---|---|
| 2,077,124 | A | 4/1937 | Miller et al. |
| 2,476,580 | A | 7/1949 | Bergman |
| 2,585,268 | A | 2/1952 | Olsen |
| 3,309,092 | A | 3/1967 | Hardesty |
| 3,420,525 | A | 1/1969 | Waders |
| 3,533,629 | A | 10/1970 | Raven |
| 3,580,581 | A | 5/1971 | Raven |
| 3,642,287 | A | 2/1972 | Lally et al. |
| 3,645,531 | A | 2/1972 | Wright |
| 3,695,615 | A | 10/1972 | Shoptaugh |
| 3,735,987 | A | 5/1973 | Ohki |

(Continued)

FOREIGN PATENT DOCUMENTS

| | | |
|---|---|---|
| AU | 50327/96 | 10/1997 |
| AU | 63553/98 | 10/1998 |

(Continued)

*Primary Examiner* — James S McCellan

(74) *Attorney, Agent, or Firm* — Neal, Gerber & Eisenberg LLP

(57) ABSTRACT

In various embodiments, the present disclosure relates generally to a game including a path of different symbol display positions. The gaming system generates one or more symbols (and/or one or more awards) at one or more of the symbol display positions of a matrix or grid. The gaming system then randomly forms a path including a plurality of the symbol display positions and determines an award for the player based on which symbol display positions are included in the formed path.

30 Claims, 19 Drawing Sheets

(56) References Cited

U.S. PATENT DOCUMENTS

| | | | |
|---|---|---|---|
| 3,770,269 | A | 11/1973 | Elder |
| 3,834,712 | A | 9/1974 | Cox |
| 3,937,565 | A | 2/1976 | Alasia |
| 4,092,654 | A | 5/1978 | Alasia |
| 4,180,271 | A | 12/1979 | McMurchie |
| 4,184,683 | A | 1/1980 | Hooker |
| 4,190,256 | A | 2/1980 | Rudden, Jr. |
| 4,198,052 | A | 4/1980 | Gauselmann |
| 4,326,351 | A | 4/1982 | Heywood et al. |
| 4,346,900 | A | 8/1982 | Lamlee |
| 4,448,419 | A | 5/1984 | Telnaes |
| 4,492,378 | A | 1/1985 | Williams |
| 4,508,345 | A | 4/1985 | Okada |
| 4,582,324 | A | 4/1986 | Koza et al. |
| 4,593,904 | A | 6/1986 | Graves |
| 4,614,344 | A | 9/1986 | O'Connor |
| 4,624,459 | A | 11/1986 | Kaufman |
| 4,648,600 | A | 3/1987 | Olliges |
| 4,669,731 | A | 6/1987 | Clarke |
| 4,695,053 | A | 9/1987 | Vazquez, Jr. et al. |
| 4,712,799 | A | 12/1987 | Fraley |
| 4,790,537 | A | 12/1988 | Smyth et al. |
| 4,826,169 | A | 5/1989 | Bessho et al. |
| 4,836,546 | A | 6/1989 | DiRe et al. |
| 4,838,552 | A | 6/1989 | Hagiwara |
| 4,874,173 | A | 10/1989 | Kishishita |
| 4,991,848 | A | 2/1991 | Greenwood et al. |
| 5,042,809 | A | 8/1991 | Richardson |
| 5,085,436 | A | 2/1992 | Bennett |
| 5,092,598 | A | 3/1992 | Kamille |
| 5,100,137 | A | 3/1992 | Fulton |
| 5,102,134 | A | 4/1992 | Smyth |
| 5,102,137 | A | 4/1992 | Ekiert |
| 5,116,055 | A | 5/1992 | Tracy |
| 5,127,651 | A | 7/1992 | Okada |
| 5,152,529 | A | 10/1992 | Okada |
| 5,163,131 | A | 11/1992 | Row et al. |
| 5,167,413 | A | 12/1992 | Fulton |
| 5,178,390 | A | 1/1993 | Okada |
| 5,184,821 | A | 2/1993 | Korenek |
| 5,188,363 | A | 2/1993 | Marnell, II et al. |
| 5,205,555 | A | 4/1993 | Hamano |
| 5,209,479 | A | 5/1993 | Nagao et al. |
| 5,251,897 | A | 10/1993 | Fulton |
| 5,259,616 | A | 11/1993 | Bergmann |
| 5,265,877 | A | 11/1993 | Boylan et al. |
| 5,277,424 | A | 1/1994 | Wilms |
| 5,292,127 | A | 3/1994 | Kelly et al. |
| 5,324,040 | A | 6/1994 | Panda |
| 5,342,035 | A | 8/1994 | Sugiyama et al. |
| 5,342,047 | A | 8/1994 | Heidel et al. |
| 5,342,049 | A | 8/1994 | Wichinsky et al. |
| 5,344,144 | A | 9/1994 | Canon |
| 5,364,100 | A | 11/1994 | Ludlow et al. |
| 5,373,440 | A | 12/1994 | Cohen et al. |
| 5,393,061 | A | 2/1995 | Manship et al. |
| 5,395,111 | A | 3/1995 | Inoue |
| 5,397,125 | A | 3/1995 | Adams |
| 5,401,024 | A | 3/1995 | Simunek |
| 5,423,539 | A | 6/1995 | Nagao |
| 5,437,451 | A | 8/1995 | Fulton |
| 5,449,173 | A | 9/1995 | Thomas et al. |
| 5,456,465 | A | 10/1995 | Durham |
| 5,472,196 | A | 12/1995 | Rusnak |
| 5,511,781 | A | 4/1996 | Wood et al. |
| 5,524,888 | A | 6/1996 | Heidel |
| 5,536,016 | A | 7/1996 | Thompson |
| 5,553,851 | A | 9/1996 | Malavazos et al. |
| 5,560,603 | A | 10/1996 | Seelig et al. |
| 5,569,084 | A | 10/1996 | Nicastro et al. |
| 5,580,053 | A | 12/1996 | Crouch |
| 5,580,055 | A | 12/1996 | Hagiwara |
| 5,580,309 | A | 12/1996 | Piechowiak et al. |
| 5,584,763 | A | 12/1996 | Kelly et al. |
| 5,584,764 | A | 12/1996 | Inoue |
| 5,609,524 | A | 3/1997 | Inoue |
| 5,611,535 | A | 3/1997 | Tiberio |
| 5,630,586 | A | 5/1997 | Lowden |
| 5,639,089 | A | 6/1997 | Matsumoto et al. |
| 5,645,485 | A | 7/1997 | Clapper, Jr. |
| 5,647,798 | A | 7/1997 | Falciglia |
| 5,655,965 | A | 8/1997 | Takemoto et al. |
| 5,695,402 | A | 12/1997 | Stupak |
| 5,697,843 | A | 12/1997 | Manship et al. |
| 5,704,835 | A | 1/1998 | Dietz, II |
| 5,711,525 | A | 1/1998 | Breeding |
| 5,722,891 | A | 3/1998 | Inoue |
| 5,732,948 | A | 3/1998 | Yoseloff |
| 5,743,526 | A | 4/1998 | Inoue |
| 5,743,799 | A | 4/1998 | Houriet et al. |
| 5,752,881 | A | 5/1998 | Inoue |
| 5,755,619 | A | 5/1998 | Matsumoto et al. |
| 5,766,074 | A | 6/1998 | Cannon et al. |
| 5,769,458 | A | 6/1998 | Carides et al. |
| 5,769,716 | A | 6/1998 | Saffari et al. |
| 5,775,692 | A | 7/1998 | Watts et al. |
| 5,779,544 | A | 7/1998 | Seelig et al. |
| 5,779,549 | A | 7/1998 | Walker et al. |
| 5,788,573 | A | 8/1998 | Baerlocher et al. |
| 5,791,989 | A | 8/1998 | Slinkman |
| 5,807,172 | A | 9/1998 | Piechowiak |
| 5,816,916 | A | 10/1998 | Moody |
| 5,817,172 | A | 10/1998 | Yamada et al. |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,848,932 | A | 12/1998 | Adams |
| 5,851,010 | A | 12/1998 | Feinberg |
| 5,851,148 | A | 12/1998 | Brune et al. |
| 5,855,514 | A | 1/1999 | Kamille |
| 5,868,392 | A | 2/1999 | Kraft |
| 5,879,235 | A | 3/1999 | Kaneko et al. |
| 5,882,259 | A | 3/1999 | Holmes, Jr. et al. |
| 5,882,261 | A | 3/1999 | Adams |
| 5,885,158 | A | 3/1999 | Torango et al. |
| 5,910,048 | A | 6/1999 | Feinberg |
| 5,911,418 | A | 6/1999 | Adams |
| 5,919,088 | A | 7/1999 | Weiss |
| 5,931,467 | A | 8/1999 | Kamille |
| 5,935,002 | A | 8/1999 | Falciglia |
| 5,947,820 | A | 9/1999 | Morro et al. |
| 5,954,335 | A | 9/1999 | Moody |
| 5,967,893 | A | 10/1999 | Lawrence et al. |
| 5,971,849 | A | 10/1999 | Falciglia |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,993,316 | A | 11/1999 | Coyle et al. |
| 5,996,997 | A | 12/1999 | Kamille |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowialt et al. |
| 6,012,983 | A | 1/2000 | Walker et al. |
| 6,015,344 | A | 1/2000 | Kelly et al. |
| 6,015,346 | A | 1/2000 | Bennett |
| 6,019,374 | A | 2/2000 | Breeding |
| 6,027,115 | A | 2/2000 | Griswold et al. |
| 6,033,307 | A | 3/2000 | Vancura |
| 6,039,649 | A | 3/2000 | Schulze |
| 6,045,129 | A | 4/2000 | Cooper |
| 6,047,963 | A | 4/2000 | Pierce et al. |
| 6,050,895 | A | 4/2000 | Luciano, Jr. et al. |
| 6,053,813 | A | 4/2000 | Mathis |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,077,163 | A | 6/2000 | Walker et al. |
| 6,082,734 | A | 7/2000 | Uehara et al. |
| 6,086,066 | A | 7/2000 | Takeuchi et al. |
| 6,089,976 | A | 7/2000 | Schneider et al. |

(56) References Cited

U.S. PATENT DOCUMENTS 6,089,977 A 7/2000 Bennett
6,089,978 A 7/2000 Adams
6,093,102 A 7/2000 Bennett
6,095,921 A 8/2000 Walker et al.
6,102,400 A 8/2000 Scott et al.
6,102,798 A 8/2000 Bennett
6,105,962 A 8/2000 Malavazos et al.
6,110,041 A 8/2000 Walker et al.
6,110,043 A 8/2000 Olsen
6,113,098 A 9/2000 Adams
6,117,009 A 9/2000 Yoseloff
6,120,031 A 9/2000 Adams
6,120,378 A 9/2000 Moody et al.
6,126,542 A 10/2000 Fier
6,129,632 A 10/2000 Luciano
6,135,885 A 10/2000 Lermusiaux
6,142,873 A 11/2000 Weiss et al.
6,142,874 A 11/2000 Kodachi et al.
6,142,875 A 11/2000 Kodachi et al.
6,146,273 A 11/2000 Olsen
6,149,156 A 11/2000 Feola
6,149,521 A 11/2000 Sanduski
6,155,925 A 12/2000 Giobbi et al.
6,158,741 A 12/2000 Koelling
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,522 B1 1/2001 Walker et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,210,276 B1 4/2001 Mullins
6,210,277 B1 4/2001 Stefan
6,213,877 B1 4/2001 Walker et al.
6,217,448 B1 4/2001 Olsen
6,220,959 B1 4/2001 Holmes, Jr. et al.
6,224,482 B1 5/2001 Bennett
6,224,483 B1 5/2001 Mayeroff
6,227,969 B1 5/2001 Yoseloff
6,227,971 B1 5/2001 Weiss
6,231,442 B1 5/2001 Mayeroff
6,231,445 B1 5/2001 Acres
6,234,879 B1 5/2001 Hasegawa et al.
6,234,897 B1 5/2001 Frohm et al.
6,237,913 B1 5/2001 Kamille
6,238,287 B1 5/2001 Komori et al.
6,238,288 B1 5/2001 Walker et al.
6,241,607 B1 6/2001 Payne et al.
6,244,957 B1 6/2001 Walker et al.
6,251,013 B1 6/2001 Bennett
6,254,482 B1 7/2001 Walker et al.
6,261,128 B1 7/2001 Heim et al.
6,261,177 B1 7/2001 Bennett
6,261,178 B1 7/2001 Bennett
6,267,669 B1 7/2001 Luciano, Jr. et al.
6,270,409 B1 8/2001 Shuster
6,270,411 B1 8/2001 Gura et al.
6,270,412 B1 8/2001 Crawford et al.
6,283,474 B1 9/2001 de Keller
6,287,194 B1 9/2001 Okada
6,288,993 B1 9/2001 Kawahara et al.
6,290,600 B1 9/2001 Glasson
6,293,866 B1 9/2001 Walker et al.
6,299,165 B1 10/2001 Nagano
6,302,790 B1 10/2001 Brossard
6,302,791 B1 10/2001 Frohm et al.
6,309,298 B1 10/2001 Gerow
6,309,299 B1 10/2001 Weiss
6,309,300 B1 10/2001 Glavich
6,311,976 B1 11/2001 Yoseloff et al.
6,312,331 B1 11/2001 Tamaki
6,312,334 B1 11/2001 Yoseloff
6,315,660 B1 11/2001 DeMar et al.
6,315,662 B1 11/2001 Jorasch et al.
6,315,664 B1 11/2001 Baerlocher et al.
6,319,124 B1 11/2001 Baerlocher et al.
6,322,309 B1 11/2001 Thomas et al.
6,328,649 B1 12/2001 Randall et al.
6,331,143 B1 12/2001 Yoseloff
6,334,814 B1 1/2002 Adams
6,334,864 B1 1/2002 Amplatz et al.
6,336,860 B1 1/2002 Webb
6,336,862 B1 1/2002 Byrne
6,340,158 B2 1/2002 Priece et al.
6,343,988 B1 2/2002 Walker et al.
6,346,043 B1 2/2002 Colin et al.
6,347,996 B1 2/2002 Gilmore et al.
RE37,588 E 3/2002 Ornstein
6,358,147 B1 3/2002 Jaffe et al.
6,364,766 B1 4/2002 Anderson et al.
6,364,767 B1 4/2002 Brossard et al.
6,364,768 B1 4/2002 Acres et al.
6,368,216 B1 4/2002 Hedrick et al.
6,375,187 B1 4/2002 Baerlocher
6,375,567 B1 4/2002 Acres
6,375,570 B1 4/2002 Poole
6,386,974 B1 5/2002 Adams
6,398,218 B1 6/2002 Vancura
6,398,644 B1 6/2002 Perrie et al.
6,406,369 B1 6/2002 Baerlocher et al.
6,409,172 B1 6/2002 Vancura
6,409,597 B1 6/2002 Mizumoto
6,413,160 B1 7/2002 Vancura
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,435,502 B2 8/2002 Matos
6,439,995 B1 8/2002 Hughs-Baird et al.
6,443,837 B1 9/2002 Jaffe et al.
6,450,883 B1 9/2002 O'Halloran
6,454,651 B1 9/2002 Yoseloff
6,460,856 B2 10/2002 Davies
6,464,581 B1 10/2002 Yoseloff et al.
6,464,582 B1 10/2002 Baerlocher et al.
6,471,208 B2 10/2002 Yoseloff et al.
6,481,713 B2 11/2002 Perrie et al.
6,491,584 B2 12/2002 Graham et al.
6,494,785 B1 12/2002 Gerrard et al.
6,500,068 B2 12/2002 Walker et al.
6,501,899 B1 12/2002 Marrs et al.
6,506,116 B1 1/2003 Sunaga et al.
6,506,118 B1 1/2003 Baerlocher et al.
6,511,375 B1 1/2003 Kaminkow
6,514,141 B1 2/2003 Kaminkow et al.
6,517,432 B1 2/2003 Jaffe
6,517,433 B2 2/2003 Loose et al.
6,522,312 B2 2/2003 Ohshima et al.
6,533,658 B1 3/2003 Walker et al.
6,533,660 B2 3/2003 Seelig et al.
6,547,242 B1 4/2003 Sugiyama et al.
6,551,187 B1 4/2003 Jaffe
6,554,703 B1 4/2003 Bussick et al.
6,558,254 B2 5/2003 Baerlocher et al.
6,561,899 B2 5/2003 Vancura
6,561,900 B1 5/2003 Baerlocher et al.
6,561,904 B2 5/2003 Loche et al.
6,565,433 B1 5/2003 Baerlocher et al.
6,569,016 B1 5/2003 Baerlocher
6,572,471 B1 6/2003 Bennett
6,572,472 B1 6/2003 Glavich
6,572,473 B1 6/2003 Baerlocher
6,581,935 B1 6/2003 Odom
6,582,307 B2 6/2003 Webb
6,592,457 B1 7/2003 Frohm et al.
6,595,854 B2 7/2003 Hughs-Baird et al.

(56) References Cited

U.S. PATENT DOCUMENTS 6,599,785 B2 7/2003 Hamada et al.
6,602,136 B1 8/2003 Baerlocher et al.
6,602,137 B2 8/2003 Kaminkow et al.
6,604,999 B2 8/2003 Ainsworth
6,607,438 B2 8/2003 Baerlocher et al.
6,609,791 B1 8/2003 Miyamoto et al.
6,609,971 B2 8/2003 Vancura
6,626,758 B1 9/2003 Parham et al.
6,632,139 B1 10/2003 Baerlocher
6,632,141 B2 10/2003 Webb et al.
6,638,164 B2 10/2003 Randall et al.
6,641,477 B1 11/2003 Dietz, II
6,645,073 B2 11/2003 Lemay et al.
6,648,754 B2 11/2003 Baerlocher et al.
6,648,758 B2 11/2003 Bennett et al.
6,666,765 B2 12/2003 Vancura
6,669,559 B1 12/2003 Baerlocher et al.
6,672,960 B1 1/2004 Jensen
6,676,126 B1 1/2004 Walker et al.
6,676,512 B2 1/2004 Fong et al.
6,676,516 B2 1/2004 Baerlocher et al.
6,688,977 B1 2/2004 Baerlocher et al.
6,692,356 B2 2/2004 Baerlocher et al.
6,702,673 B2 3/2004 Webb
6,719,630 B1 4/2004 Seelig et al.
6,722,976 B2 4/2004 Adams
6,722,981 B2 4/2004 Kaminkow et al.
6,722,982 B2 4/2004 Kaminkow et al.
6,726,562 B2 4/2004 Vancura
6,731,313 B1 5/2004 Kaminkow
6,733,386 B2 5/2004 Cuddy et al.
6,746,016 B2 6/2004 Perrie et al.
6,746,328 B2 6/2004 Cannon et al.
6,746,329 B1 6/2004 Duhamel
6,749,502 B2 6/2004 Baerlocher
6,749,504 B2 6/2004 Hughs-Baird
6,752,717 B2 6/2004 Vancura
6,761,632 B2 7/2004 Bansemer et al.
6,761,633 B2 7/2004 Riendeau et al.
6,769,983 B2 8/2004 Slomiany
6,769,986 B2 8/2004 Vancura
6,780,103 B2 8/2004 Bansemer et al.
6,780,107 B2 8/2004 Baerlocher et al.
6,783,455 B2 8/2004 Glavich
6,783,457 B2 8/2004 Hughs-Baird et al.
6,786,818 B1 9/2004 Rothschild et al.
6,786,820 B2 9/2004 Gerrard et al.
6,808,454 B2 10/2004 Gerrard et al.
6,811,482 B2 11/2004 Letovsky
6,817,944 B2 11/2004 Kaminkow et al.
6,824,465 B2 11/2004 Luciano et al.
6,840,858 B2 1/2005 Adams
6,843,722 B2 1/2005 Webb
6,843,723 B2 1/2005 Joshi
6,852,027 B2 2/2005 Kaminkow et al.
6,852,028 B2 2/2005 Vancura
6,855,053 B2 2/2005 Baerlocher
6,855,055 B2 2/2005 Perrie et al.
6,863,606 B1 3/2005 Berg et al.
6,875,108 B1 4/2005 Hughs-Baird
6,878,061 B2 4/2005 Baerlocher et al.
6,893,341 B2 5/2005 Walker et al.
6,899,620 B2 5/2005 Kaminkow et al.
6,899,622 B2 5/2005 Lind et al.
6,908,383 B2 6/2005 Baerlocher et al.
6,910,962 B2 6/2005 Marks et al.
6,918,830 B2 7/2005 Baerlocher
6,918,832 B2 7/2005 Baerlocher et al.
6,918,834 B2 7/2005 Vancura
6,926,273 B1 8/2005 Vancura
6,929,545 B2 8/2005 Vancura
6,929,952 B2 8/2005 Baerlocher
6,932,701 B2 8/2005 Glavich et al.
6,935,947 B1 8/2005 Singer et al.
6,939,229 B2 9/2005 McClintic
6,942,568 B2 9/2005 Baerlocher
6,958,013 B2 10/2005 Miereau et al.
6,960,133 B1 11/2005 Marks et al.
6,964,416 B2 11/2005 McClintic et al.
6,966,833 B2 11/2005 Kaminkow et al.
6,971,953 B2 12/2005 Gerrard et al.
6,981,635 B1 1/2006 Hughs-Baird et al.
6,984,174 B2 1/2006 Cannon et al.
6,986,711 B2 1/2006 Vancura
6,988,732 B2 1/2006 Vancura
6,988,947 B2 1/2006 Baerlocher et al.
6,988,948 B2 1/2006 Perrie et al.
6,991,539 B2 1/2006 Pacey
6,997,805 B2 2/2006 Vancura
7,037,191 B2 5/2006 Rodgers et al.
7,040,983 B2 5/2006 Dolloff et al.
7,040,984 B2 5/2006 Mead
7,056,192 B2 6/2006 Venigalla et al.
7,056,210 B2 6/2006 Bansemer et al.
7,056,214 B2 6/2006 Miereau et al.
7,059,967 B2 6/2006 Baerlocher
7,070,503 B2 7/2006 Rudolph
7,073,793 B2 7/2006 Vancura
7,077,744 B2 7/2006 Cannon
7,086,945 B2 8/2006 Vancura
7,104,888 B2 9/2006 Miereau et al.
7,112,136 B2 9/2006 Anderson et al.
7,112,137 B2 9/2006 Baerlocher et al.
7,121,942 B2 10/2006 Baerlocher
7,128,646 B2 10/2006 Baerlocher et al.
7,128,647 B2 10/2006 Muir
7,144,322 B2 12/2006 Gomez et al.
7,160,186 B2 1/2007 Cuddy et al.
7,160,188 B2 1/2007 Kaminkow et al.
7,172,506 B2 2/2007 Baerlocher et al.
7,175,521 B2 2/2007 McClintic
7,175,524 B2 2/2007 Bansemer et al.
7,182,689 B2 2/2007 Hughs-Baird et al.
7,192,343 B2 3/2007 Vancura
7,192,347 B1 3/2007 Marks et al.
7,217,187 B2 5/2007 Vancura
7,229,350 B2 6/2007 Baerlocher et al.
7,234,700 B2 6/2007 Vancura
7,235,011 B2 6/2007 Randall et al.
7,247,096 B2 7/2007 Vancura
7,252,591 B2 8/2007 Van Asdale
7,264,545 B2 9/2007 Maya et al.
7,273,415 B2 9/2007 Cregan et al.
7,294,055 B2 11/2007 Baerlocher et al.
7,300,348 B2 11/2007 Kaminkow et al.
7,303,469 B2 12/2007 Kaminkow
7,314,409 B2 1/2008 Maya et al.
7,316,609 B2 1/2008 Dunn et al.
7,326,115 B2 2/2008 Baerlocher
7,335,102 B2 2/2008 Baerlocher et al.
7,338,367 B2 3/2008 Kaminkow et al.
7,338,369 B2 3/2008 Mierau et al.
7,341,512 B2 3/2008 Dolloff et al.
7,351,141 B2 4/2008 Rodgers et al.
7,371,174 B2 5/2008 Baerlocher
7,377,849 B2 5/2008 Baerlocher et al.
7,399,226 B2 7/2008 Mishra
7,402,103 B2 7/2008 Baerlocher
7,413,510 B2 8/2008 Schlegel et al.
7,419,431 B2 9/2008 Gauselmann et al.
7,431,645 B2 10/2008 Han et al.
7,448,948 B2 11/2008 Hughs-Baird et al.
7,488,250 B2 2/2009 Baerlocher et al.
7,494,412 B2 2/2009 Baerlocher
7,541,252 B2 6/2009 Eun et al.
7,544,129 B2 6/2009 Baerlocher
7,556,561 B2 7/2009 White et al.
7,578,136 B2 8/2009 Derouineau et al.
7,578,735 B2 8/2009 Frizzell et al.
7,674,176 B2 3/2010 Berman et al.
7,708,627 B2 5/2010 Lind
7,749,068 B2 7/2010 Cuddy et al.
8,007,358 B2 8/2011 Linard et al.
8,221,206 B2 7/2012 Marks et al.

(56) References Cited

U.S. PATENT DOCUMENTS

| | | | |
|---|---|---|---|
| 2001/0009865 | A1 | 7/2001 | DeMar et al. |
| 2001/0024970 | A1 | 9/2001 | McKee et al. |
| 2001/0038178 | A1 | 11/2001 | Vancura |
| 2001/0040341 | A1 | 11/2001 | Kamille |
| 2001/0041610 | A1 | 11/2001 | Luciano et al. |
| 2002/0052232 | A1 | 5/2002 | Kaminkow |
| 2002/0052233 | A1 | 5/2002 | Gauselmann |
| 2002/0053089 | A1 | 5/2002 | Massey |
| 2002/0058545 | A1 | 5/2002 | Luciano |
| 2002/0077172 | A1 | 6/2002 | Uchiyama et al. |
| 2002/0086725 | A1 | 7/2002 | Fasbender et al. |
| 2002/0147040 | A1 | 10/2002 | Walker et al. |
| 2002/0198039 | A1 | 12/2002 | Marks et al. |
| 2003/0013518 | A1 | 1/2003 | Graham |
| 2003/0017868 | A1 | 1/2003 | Crawford |
| 2003/0027624 | A1 | 2/2003 | Gilmore et al. |
| 2003/0045345 | A1 | 3/2003 | Berman |
| 2003/0054875 | A1 | 3/2003 | Marks et al. |
| 2003/0057645 | A1 | 3/2003 | Baerlocher et al. |
| 2003/0060271 | A1 | 3/2003 | Gilmore et al. |
| 2003/0064786 | A1 | 4/2003 | Weiss |
| 2003/0073480 | A1 | 4/2003 | Thomas et al. |
| 2003/0087687 | A1 | 5/2003 | Locke et al. |
| 2003/0130024 | A1 | 7/2003 | Darby |
| 2003/0130028 | A1 | 7/2003 | Aida et al. |
| 2003/0153375 | A1 | 8/2003 | Vancura |
| 2003/0176210 | A1 | 9/2003 | Vancura |
| 2003/0181234 | A1 | 9/2003 | Falciglia, Sr. |
| 2003/0186737 | A1 | 10/2003 | Bennett et al. |
| 2003/0190942 | A1 | 10/2003 | Kaminkow et al. |
| 2003/0190945 | A1 | 10/2003 | Bussick et al. |
| 2003/0195028 | A1 | 10/2003 | Glavich |
| 2003/0207710 | A1 | 11/2003 | Rodgers et al. |
| 2003/0211881 | A1 | 11/2003 | Walker et al. |
| 2003/0216165 | A1 | 11/2003 | Singer et al. |
| 2004/0014521 | A1 | 1/2004 | Seelig et al. |
| 2004/0018872 | A1 | 1/2004 | Baerlocher et al. |
| 2004/0018874 | A1 | 1/2004 | Bonney et al. |
| 2004/0036212 | A1 | 2/2004 | Walker et al. |
| 2004/0048646 | A1 | 3/2004 | Visocnik |
| 2004/0048649 | A1 | 3/2004 | Peterson et al. |
| 2004/0053657 | A1 | 3/2004 | Fiden et al. |
| 2004/0053662 | A1 | 3/2004 | Pacey |
| 2004/0053665 | A1 | 3/2004 | Baerlocher |
| 2004/0058727 | A1 | 3/2004 | Marks et al. |
| 2004/0067790 | A1 | 4/2004 | Peterson et al. |
| 2004/0082374 | A1 | 4/2004 | Maya et al. |
| 2004/0082378 | A1 | 4/2004 | Peterson et al. |
| 2004/0102238 | A1 | 5/2004 | Taylor |
| 2004/0106444 | A1 | 6/2004 | Cuddy et al. |
| 2004/0106445 | A1 | 6/2004 | Perrie et al. |
| 2004/0137981 | A1 | 7/2004 | Gauselmann et al. |
| 2004/0162133 | A1 | 8/2004 | Jackson |
| 2004/0176156 | A1 | 9/2004 | Walker et al. |
| 2004/0185927 | A1 | 9/2004 | Baerlocher et al. |
| 2004/0192431 | A1 | 9/2004 | Singer et al. |
| 2004/0195773 | A1 | 10/2004 | Masci et al. |
| 2004/0204223 | A1 | 10/2004 | Cuddy et al. |
| 2004/0217548 | A1 | 11/2004 | Snow |
| 2004/0248639 | A1 | 12/2004 | Slomiany |
| 2004/0254019 | A1 * | 12/2004 | Riendeau et al. ............... 463/42 |
| 2004/0266509 | A1 | 12/2004 | Bennett et al. |
| 2005/0009597 | A1 | 1/2005 | Daly |
| 2005/0014553 | A1 | 1/2005 | Byrne |
| 2005/0020351 | A1 | 1/2005 | Baerlocher et al. |
| 2005/0033461 | A1 | 2/2005 | Gerrard et al. |
| 2005/0040601 | A1 | 2/2005 | Yoseloff et al. |
| 2005/0043081 | A1 | 2/2005 | Baerlocher |
| 2005/0054405 | A1 | 3/2005 | Baerlocher et al. |
| 2005/0054415 | A1 | 3/2005 | Kaminkow et al. |
| 2005/0054416 | A1 | 3/2005 | Hostetler et al. |
| 2005/0054434 | A1 | 3/2005 | Baerlocher et al. |
| 2005/0054435 | A1 | 3/2005 | Rodgers et al. |
| 2005/0054436 | A1 | 3/2005 | Frizzell et al. |
| 2005/0059456 | A1 | 3/2005 | Mead et al. |
| 2005/0059461 | A1 | 3/2005 | Ching et al. |
| 2005/0071023 | A1 | 3/2005 | Gilliland et al. |
| 2005/0096123 | A1 | 5/2005 | Cregan et al. |
| 2005/0101372 | A1 | 5/2005 | Miereau et al. |
| 2005/0101378 | A1 | 5/2005 | Kaminkow et al. |
| 2005/0124406 | A1 | 6/2005 | Cannon |
| 2005/0148384 | A1 | 7/2005 | Marks et al. |
| 2005/0164793 | A1 | 7/2005 | Merimovich et al. |
| 2005/0181853 | A1 | 8/2005 | Baerlocher |
| 2005/0187011 | A1 | 8/2005 | Kaminkow |
| 2005/0192081 | A1 | 9/2005 | Marks et al. |
| 2005/0192091 | A1 | 9/2005 | Siewert et al. |
| 2005/0239528 | A1 | 10/2005 | Moody |
| 2005/0245307 | A1 | 11/2005 | Gatto et al. |
| 2006/0003832 | A1 | 1/2006 | Mincey et al. |
| 2006/0025196 | A1 | 2/2006 | Webb et al. |
| 2006/0030387 | A1 | 2/2006 | Jackson |
| 2006/0030401 | A1 | 2/2006 | Mead et al. |
| 2006/0046836 | A1 | 3/2006 | Walker et al. |
| 2006/0058095 | A1 | 3/2006 | Berman et al. |
| 2006/0068882 | A1 | 3/2006 | Baerlocher et al. |
| 2006/0068883 | A1 | 3/2006 | Randall et al. |
| 2006/0073874 | A1 | 4/2006 | Cregan et al. |
| 2006/0084497 | A1 | 4/2006 | Marks et al. |
| 2006/0084500 | A1 | 4/2006 | Baerlocher et al. |
| 2006/0121969 | A1 | 6/2006 | Marks et al. |
| 2006/0121978 | A1 | 6/2006 | Hornik et al. |
| 2006/0183528 | A1 | 8/2006 | Rodgers et al. |
| 2006/0183535 | A1 | 8/2006 | Marks et al. |
| 2006/0205473 | A1 | 9/2006 | Gomez et al. |
| 2006/0205474 | A1 | 9/2006 | Bansemer et al. |
| 2006/0246977 | A1 | 11/2006 | Cannon |
| 2006/0276243 | A1 | 12/2006 | Reinsdorff et al. |
| 2007/0015566 | A1 | 1/2007 | Baerlocher et al. |
| 2007/0021176 | A1 | 1/2007 | Jackson |
| 2007/0026923 | A1 | 2/2007 | Muir |
| 2007/0032285 | A1 | 2/2007 | Wolf |
| 2007/0060271 | A1 | 3/2007 | Cregan et al. |
| 2007/0087809 | A1 | 4/2007 | Baerlocher |
| 2007/0111783 | A1 | 5/2007 | Cuddy et al. |
| 2007/0117606 | A1 | 5/2007 | Baerlocher |
| 2007/0129128 | A1 | 6/2007 | McClintic |
| 2007/0129131 | A1 | 6/2007 | Kaminkow et al. |
| 2007/0129133 | A1 | 6/2007 | Bansemer et al. |
| 2007/0149267 | A1 | 6/2007 | Ross et al. |
| 2007/0149269 | A1 | 6/2007 | Benbrahim |
| 2008/0004105 | A1 | 1/2008 | Cregan et al. |
| 2008/0119283 | A1 | 5/2008 | Baerlocher |
| 2008/0146321 | A1 | 6/2008 | Parente |
| 2008/0188287 | A1 | 8/2008 | Schlegel et al. |
| 2008/0200238 | A1 | 8/2008 | Mishra |
| 2008/0311980 | A1 | 12/2008 | Cannon |
| 2009/0104959 | A1 | 4/2009 | Caputo et al. |
| 2009/0124326 | A1 | 5/2009 | Caputo et al. |
| 2009/0166971 | A1 | 7/2009 | Mebane |
| 2011/0039614 | A1 | 2/2011 | Caputo et al. |
| 2012/0302319 | A1 | 11/2012 | Linard et al. |
| 2013/0122988 | A1 | 5/2013 | Guinn et al. |

FOREIGN PATENT DOCUMENTS

| | | |
|---|---|---|
| AU | 711501 | 10/1999 |
| CA | 2288723 | 10/1998 |
| EP | 219305 | 4/1987 |
| EP | 0698869 | 2/1996 |
| EP | 0798676 | 10/1997 |
| EP | 0874337 | 10/1998 |
| EP | 0945837 | 3/1999 |
| EP | 1083531 | 3/2001 |
| EP | 1205897 | 10/2001 |
| EP | 1298601 | 4/2003 |
| EP | 1336941 | 8/2003 |
| EP | 1617386 | 1/2006 |
| EP | 1635306 | 3/2006 |
| EP | 1653416 | 5/2006 |
| GB | 2089086 | 6/1982 |
| GB | 2090690 | 7/1982 |
| GB | 2096376 | 10/1982 |
| GB | 2097160 | 10/1982 |

(56) References Cited

FOREIGN PATENT DOCUMENTS

| | | |
|---|---|---|
| GB | 2100905 | 1/1983 |
| GB | 2105891 | 3/1983 |
| GB | 2106682 | 4/1983 |
| GB | 2117155 | 10/1983 |
| GB | 2130413 | 5/1984 |
| GB | 2137392 | 10/1984 |
| GB | 2147644 | 3/1985 |
| GB | 2147442 | 5/1985 |
| GB | 2147773 | 5/1985 |
| GB | 2161008 | 1/1986 |
| GB | 2183882 | 6/1986 |
| GB | 2170643 | 8/1986 |
| GB | 2181589 | 4/1987 |
| GB | 2190227 | 11/1987 |
| GB | 2191030 | 12/1987 |
| GB | 2213624 | 8/1989 |
| GB | 2222712 | 3/1990 |
| GB | 2225889 | 6/1990 |
| GB | 2226436 | 6/1990 |
| GB | 2242300 | 9/1991 |
| GB | 2262642 | 6/1993 |
| GB | 2316214 | 2/1998 |
| GB | 2201821 | 9/1998 |
| GB | 2328311 | 2/1999 |
| GB | 2333880 | 8/1999 |
| GB | 2341262 | 3/2000 |
| GB | 2353128 | 2/2001 |
| GB | 2372132 | 8/2002 |
| GB | 2422121 | 7/2006 |
| JP | 2007307305 | 11/2007 |
| WO | WO 85/00910 | 2/1985 |
| WO | WO 96/35491 | 11/1996 |
| WO | WO 97/32285 | 9/1997 |
| WO | WO 99/64997 | 12/1999 |
| WO | WO 00/12186 | 3/2000 |
| WO | WO 00/32286 | 6/2000 |
| WO | WO 01/15055 | 3/2001 |
| WO | WO 01/26019 | 4/2001 |
| WO | WO 01/41892 | 6/2001 |
| WO | WO 01/74464 | 10/2001 |
| WO | WO 01/93967 | 12/2001 |
| WO | WO 02/077935 | 10/2002 |
| WO | WO 02/102484 | 12/2002 |
| WO | WO 03/089084 | 10/2003 |
| WO | WO 03/089088 | 10/2003 |
| WO | WO 2005/009560 | 3/2005 |
| WO | WO 2005/027058 | 3/2005 |
| WO | WO 2005/027061 | 3/2005 |
| WO | WO 2005/035080 | 4/2005 |
| WO | WO 2005/057339 | 6/2005 |
| WO | WO 2005/075037 | 8/2005 |
| WO | WO 2005/086018 | 9/2005 |
| WO | WO 2005/105241 | 11/2005 |
| WO | WO 2006/009248 | 1/2006 |
| WO | WO 2007/021724 | 7/2007 |

* cited by examiner

GAMING SYSTEM AND METHOD FOR PROVIDING A GAME WHICH POPULATES SYMBOLS ALONG A PATH

CROSS REFERENCE TO RELATED APPLICATIONS

This application relates to the following co-pending commonly owned patent applications: "GAMING SYSTEM AND METHOD FOR PROVIDING A GAME WHICH POPULATES SYMBOLS ALONG A PATH," Ser. No. 13/628,893; "GAMING SYSTEM AND METHOD FOR PROVIDING A GAME WHICH POPULATES SYMBOLS ALONG A PATH," Ser. No. 13/628,835.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming devices which provide players awards in primary or base games are known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming devices. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

Certain known secondary games include a path wherein a symbol advances from one location of the path toward a destination location of the path. In certain of these known secondary games, a player may receive bonus values when the player's symbol lands on various locations of the path. In certain of these known secondary games, the player may receive a relatively high bonus value when the player's symbol reaches the destination location of the path.

There is a continuing need to provide new and different gaming devices and gaming systems as well as new and different ways to provide awards to players utilizing one or more paths.

SUMMARY

In various embodiments, the present disclosure relates generally to gaming systems and methods for providing a game including a path of different symbol display positions. In different embodiments, the path game includes a matrix or game area of a plurality of symbol display positions. In these embodiments, the gaming system generates one or more symbols (and/or one or more awards) at one or more of the symbol display positions of the matrix or grid. The gaming system then randomly forms a path including a plurality of the symbol display positions and displays the formed path to the player. The gaming system then determines an award for the player based on which symbol display positions are included in the formed path. Specifically, the gaming system of these embodiments determines a total path game award for the player based on which symbols (and/or which awards) are displayed at the symbol display positions included in the randomly formed path. Such a gaming system increases certain player's level of excitement and enjoyment by providing that one or more awards provided to such players is based on both the random selection of the symbol display positions to be included in the path as well as the random generation of any symbols (and/or awards) displayed at such symbol display positions selected to be included in the path.

In different embodiments, for various plays of various path games disclosed herein, the gaming system displays a matrix or game area having a plurality of symbol display positions. The gaming system generates a symbol at each of the symbol display positions. The gaming system then randomly selects a plurality of the symbol display positions to form a displayed path including: (i) a starting or entering symbol display position; (ii) a plurality of adjacent symbol display positions (wherein each symbol display position is adjacent to at least one other symbol display position); and (iii) an ending or exit symbol display position. In certain embodiments, in addition to determining the quantity of adjacent symbol display positions in forming the path, the gaming system also randomly determines the starting symbol display position and/or the ending symbol display position. Following the random selection of the symbol display positions which form the displayed path, the gaming system displays a collector or accumulator entering the path at the starting symbol display position and moving along the path through each of the adjacent symbol display positions until the collector reaches the ending symbol display position. In these embodiments, the collector accumulates or collects the symbol displayed at each of the symbol display positions of the path which the collector visits. Following the collector reaching the ending symbol display position (and thus following the collector accumulating the symbols of the visited symbol display positions along the randomly determined path), the gaming system determines a total path game award for the player based on the symbols accumulated by the collector. Such a configuration provides an increased level of excitement and enjoyment for players by determining the player's total path game award based on: (i) the determination of a quantity of symbol display positions to include in the path, (ii) the determination of which symbol display positions to include in the path, and (iii) the plurality of determinations of which symbols to display at each of the symbol display positions included in the path.

In one such embodiment, the gaming system displays a plurality of adjacent symbol display positions, randomly generates one of a plurality of symbols at a plurality of the adjacent symbol display positions and randomly selects a quantity of the adjacent symbol display positions, wherein the selected quantity of adjacent symbol display positions form a displayed path of symbol display positions. In this embodiment, the gaming system accumulates each of the symbols generated at each of the randomly selected symbol display positions of the formed path, determines if any awards are associated with the accumulated symbols, and displays any determined awards associated with the accumulated symbols.

In different embodiments, for various plays of various path games disclosed herein, the gaming system displays a matrix or game area having a plurality of symbol display positions including a predetermined or predefined starting or entering symbol display position. In these embodiments, the gaming system randomly selects one or more of the symbol display positions adjacent to the predetermined starting symbol display position to form a displayed path of symbol display positions (which includes the predetermined starting symbol display position). In certain embodiments, the gaming system further forms one or more additional paths including one or more additional adjacent symbol display positions (which each exclude the predetermined starting symbol display position).

After forming one or more paths of symbol display positions, the gaming system of these embodiments generates a symbol (and/or an award) at zero, one or more of the symbol display positions of the formed path(s). In addition to the random selection of the path of symbol display positions and the generation of any symbols (and/or awards) at any of the symbol display positions, the gaming system displays a collector or accumulator at the predetermined starting symbol display position. The gaming system displays the collector moving through each of the adjacent symbol display positions of the formed path which includes the predetermined starting symbol display position. In these embodiments, the collector accumulates or collects any symbols (and/or any awards) displayed at each of the symbol display positions which the collector visits. Following the collector visiting each of the symbol display positions of the formed path which includes the predetermined starting symbol display position (and thus following the collector accumulating the symbols (and/or awards) of the visited symbol display positions), the gaming system determines a total path game award for the player based on the symbols (and/or awards) collected or accumulated by the collector. Such a configuration provides an increased level of excitement and enjoyment for players by determining the player's award based on the random determination of which symbol display positions (beyond the starting symbol display position) to include in the path and the random determinations of which symbols (and/or awards) to display at each of the symbol display positions of the formed path of symbol display positions.

In one such embodiment, the gaming system displays a plurality of symbol display positions including a predetermined starting symbol display position, and randomly generates one of a plurality of symbols at at least one of the symbol display positions. In this embodiment, the gaming system displays a randomly formed path of the symbol display positions, the randomly formed path including at least the starting symbol display position and at least one of the plurality of symbol display positions adjacent to the starting symbol display position, and determines whether to accumulate any of the symbols generated at any of the symbol display positions of the formed path. If the determination is to accumulate any of the symbols generated at any of the symbol display positions of the formed path, the gaming system of this embodiment, accumulates at least one of the symbols generated at at least one of the symbol display positions of the formed path, determines any awards associated with the at least one accumulated symbol, and displays any determined awards.

In different embodiments, for various plays of various path games disclosed herein, the gaming system displays a matrix or game area having a plurality of symbol display positions. The symbol display positions include: (i) a starting or entering symbol display position; (ii) a plurality of adjacent symbol display positions (wherein each symbol display position is adjacent to at least one other symbol display position); and (iii) an ending or exit symbol display position. In these embodiments, the gaming system randomly associates a symbol (and/or an award) at one or more of the symbol display positions. Following such association, the gaming system displays a randomly formed path of symbol display positions which begins at the starting symbol display position and includes one or more of the adjacent symbol display positions. In one such embodiment, the gaming system provides the player any awards based on the symbols (and/or awards) associated with the symbol display positions of the formed path.

Following the random formation of the path of symbol display positions, the gaming system determines if the formed path connects the starting symbol display position with the ending symbol display position. If the formed path connects the starting symbol display position with the ending symbol display position, the gaming system terminates the play of this path game. In one such embodiment, if the formed path does not connect the starting symbol display position and the ending symbol display position, the gaming system reclassifies one or more of the symbol display positions adjacent to the ending symbol display position as part of the ending symbol display position (i.e., the gaming system modifies the ending symbol display position to include a plurality of the symbol display positions of the matrix). In another such embodiment, if the formed path does not connect the starting symbol display position and the ending symbol display position, the gaming system reclassifies one or more of the symbol display positions adjacent to the starting symbol display position as part of the starting symbol display position (i.e., the gaming system modifies the starting symbol display position to include a plurality of the symbol display positions of the matrix). In another such embodiment, if the formed path does not connect the starting symbol display position and the ending symbol display position, the gaming system reclassifies one or more of the symbol display positions adjacent to the ending symbol display position as part of the ending symbol display position and further reclassifies one or more of the symbol display positions adjacent to the starting symbol display position as part of the starting symbol display position.

Following such a reclassification, the gaming system reassociates a symbol (and/or an award) at one or more of the symbol display positions, reforms a path of symbol display positions (which begins at the starting symbol display position (or the modified starting symbol display position) and includes one or more of the adjacent symbol display positions) and determines whether the formed path connects the starting symbol display position (or the modified starting symbol display position) with the ending symbol display position (or the modified ending symbol display position). Such a process continues until the formed path connects the starting symbol display position (or the modified starting symbol display position) with the ending symbol display position (or the modified ending symbol display position) and the play of this path game ends. This configuration provides an increased level of excitement and enjoyment for certain players by potentially enabling the player to participate in many iterations of the path game (i.e., many paths are formed) and thus provides players with the opportunity to win multiple awards for a single play of the path game. Such a configuration also provides an increased level of excitement and enjoyment for players by determining the awards provided to the player based on the quantity of different paths formed and the symbols (and/or awards) associated with the symbol display positions of the various formed paths.

In one such embodiment, the gaming system displays a plurality of symbol display positions including a starting symbol display position and an ending symbol display position. In this embodiment, the gaming system randomly generates one of a plurality of symbols at at least one of the symbol display positions and selects a plurality of the symbol display positions to form a displayed path of symbol display positions. If the formed path connects the starting symbol display position and the ending symbol display position, the gaming system accumulates at least one of the symbols generated at at least one of the selected symbol display positions of the formed path, determines any awards associated with the at least one accumulated symbol, and displays any determined awards. If the formed path does not connect the starting symbol display position and the ending symbol display position, the gaming system modifies at least one of the starting symbol display position and the ending symbol display position and repeats the selection of the plurality of the symbol display positions to form a displayed path of symbol display positions and any accumulation of any generated symbols (if the formed path connects the starting symbol display position and the ending symbol display position) until the formed path connects any modified starting symbol display position and any modified ending symbol display position. When the formed path connects any modified starting symbol display position and any modified ending symbol display position, the gaming system accumulates at least one of the symbols generated at at least one of the selected symbol display positions of the formed path, determines any awards associated with the at least one accumulated symbol, and displays any determined awards.

Additional features and advantages are described in, and will be apparent from, the following Detailed Description and the figures.

DETAILED DESCRIPTION

Path Games

In various embodiments, the gaming system disclosed herein provides various path games which each include a matrix or grid of a plurality of symbol display positions. In certain of these embodiments, the gaming system generates one or more symbols (and/or one or more awards) at one or more of the symbol display positions of the matrix or grid. The gaming system further displays a randomly formed path including a plurality of the symbol display positions. The gaming system of such embodiments determines a total path game award for the player based on which symbol display positions are included in the formed path (and specifically which symbols and/or awards are displayed at the symbol display positions included in the formed path).

While the embodiments described below are directed to a secondary game, it should be appreciated that the present disclosure may additionally or alternatively be employed in association with a primary wagering game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Figure 1:
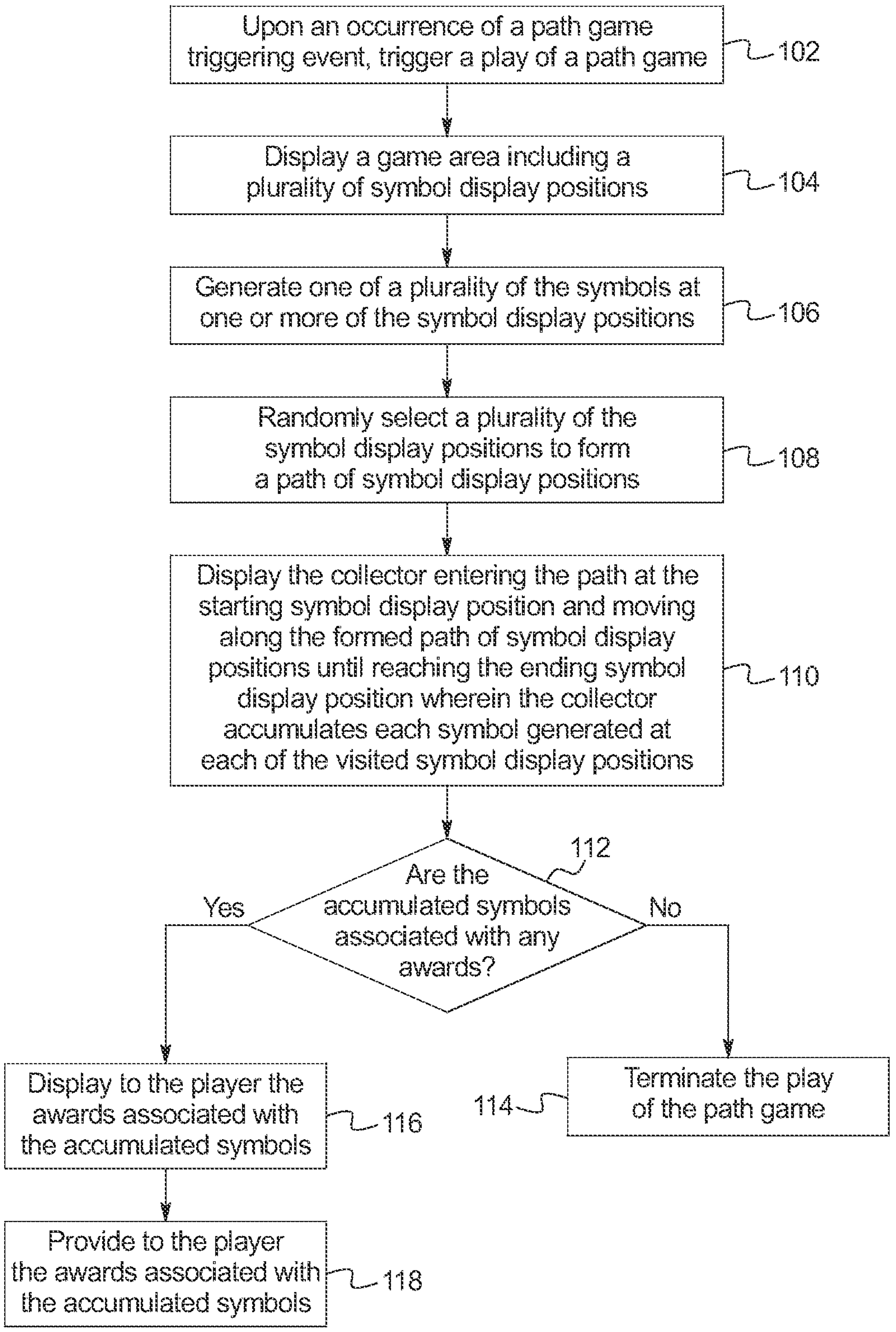
FIG. 1 is a flow chart of an example process for operating a gaming system providing one embodiment of a game employing a path.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of a path game triggering event, as indicated in block 102 of FIG. 1, the gaming system triggers a play of a path game. In one embodiment, the path game is a primary game wherein a path game triggering event occurs upon a player placing a wager to play the path game. In another embodiment, the path game is a secondary or bonus game wherein a path game triggering event occurs based on a displayed event associated with a wagered on play of a primary game. In another embodiment wherein the path game is a secondary or bonus game, a path game triggering event occurs based on an event independent of any displayed event associated with a wagered on play of a primary game.

In one embodiment, for the triggered path game, the gaming system displays a game area including plurality of symbol display positions as indicated in block 104. In one such embodiment, the game area includes a plurality of levels or sets of symbol display positions. In this embodiment, the gaming system displays each level or set including at least one of the symbol display positions adjacent to at least one other level or set of at least one of the symbol display positions. In another such embodiment, the game area includes a grid configuration having a plurality of rows of symbol display positions and a plurality of columns of symbol display positions. In another such embodiment, the game area includes a non-grid configuration including a plurality of symbol display positions.

After displaying the game area including the plurality of symbol display positions, the gaming system generates one of a plurality of symbols at one or more of the symbol display positions as indicated in block 106. In one such embodiment, the gaming system generates one of a plurality of symbols at each of the symbol display positions. In another such embodiments, the gaming system generates one of a plurality of symbols at less than each of the symbol display positions.

The gaming system then randomly selects a plurality of the symbol display positions to form a path of symbol display positions as indicated in block 108. The formed path of symbol display positions includes a displayed starting or entering symbol display position, a displayed plurality of adjacent symbol display positions (wherein each symbol display position is adjacent to at least two other symbol display positions) and a displayed ending or exit symbol display position. In one such embodiment, the plurality of symbol display positions include a plurality of sets or levels of symbol display positions with one or more connectors between each set or level. In this embodiment, the gaming system randomly selects the plurality of symbol display positions of the path by randomly determining, for one or more of the sets or levels of symbol display positions, which symbol display position from one level or set to connect or link with another symbol display position from another level or set.

It should be appreciated that while this illustrated embodiment generates a plurality of symbols at one OF more symbol display positions and then selects a plurality of the symbol display positions to form the path of symbol display positions, it is contemplated to first select a plurality of symbol display positions to form the path of symbol display positions and then generate a plurality of symbols at one or more symbol display positions.

After determining the path of symbol display positions, the gaming system displays a collector or accumulator entering the path at the starting symbol display position and moving along the formed path of symbol display positions until reaching the ending symbol display position as indicated in block 110 of FIG. 1. As further indicated in block 110, in association with displaying the collector passing through each symbol display position of the formed path, the gaming system accumulates each symbol generated at each of such visited symbol display positions. That is, the gaming system displays the collector entering the path at the starting symbol display position, moving in one direction through each of the adjacent symbol display positions of the path and ending at (or alternatively exiting at) the ending symbol display position.

Upon the collector or accumulator reaching the ending symbol display position of the path, the gaming system determines if the accumulated symbols are associated with any awards as indicated in diamond 112. It should be appreciated that for different plays of this path game, the gaming system evaluates different quantities of accumulated symbols to determine any awards associated with the accumulated symbols. That is, for each play of this path game, the quantity of symbol display positions in the formed path of symbol display positions determines, at least in part, a probability of winning one or more awards associated with the play of this path game. Put differently, the higher the quantity of symbol display positions included in the formed path of symbol display position, the higher the quantity of accumulated symbols and thus the higher the chances that one or more of the accumulated symbols (or combination of such accumulated symbols) are associated with one or more awards.

If the accumulated symbols are not associated with any awards, the gaming system terminates the play of the path game as indicated in block 114. On the other hand, if the accumulated symbols are associated with any awards, the gaming system displays such associated awards to the player and provides the player such associated awards as indicated in blocks 116 and 118. It should thus be appreciated that such a configuration provides an increased level of excitement and enjoyment for players by determining the player's total path game award based on: (i) the determination of a quantity of symbol display positions to include in the path, (ii) the determination of which symbol display positions to include in the path, and (iii) the plurality of determinations of which symbols to display at each of the symbol display positions included in the path.

Figure 2A:
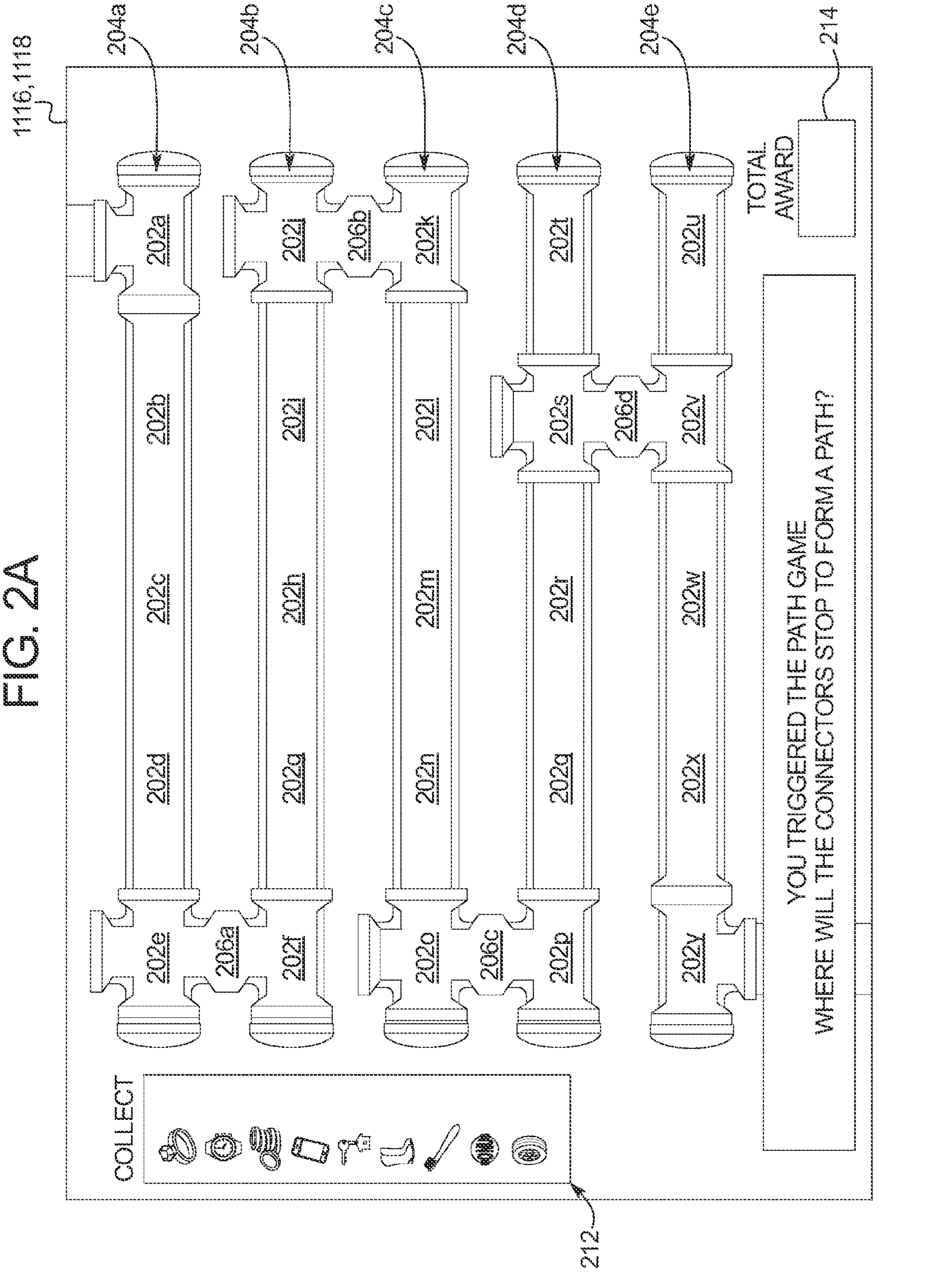
FIGS. 2A, 2B, 2C and 2D are front views of one embodiment of the gaming system disclosed herein illustrating a play of an example game which employs a randomly determined path of symbol display positions.

Turning to an example play of one embodiment of a path game, as seen in FIG. 2A, the gaming system displays a game area including a plurality of symbol display positions 202*a* to 202*y*. In this example, the plurality of symbol display positions include a plurality of sets or levels of symbol display positions (indicated as rows 204*a*, 204*b*, 204*c*, 204*d* and 204*e*). In addition to displaying the plurality of symbol display positions, the gaming system displays a plurality of connectors 206*a*, 206*b*, 206*c* and 206*d* moving throughout the game area. Such connectors link or connect one symbol display position from one level or set of symbol display positions with another symbol display position from another level or set of symbol display positions. In this example, the gaming system provides appropriate messages such as "YOU TRIGGERED THE PATH GAME" and "WHERE WILL THE CONNECTORS STOP TO FORM A PATH?" to the player visually, or through suitable audio or audiovisual displays.

Figure 2B:
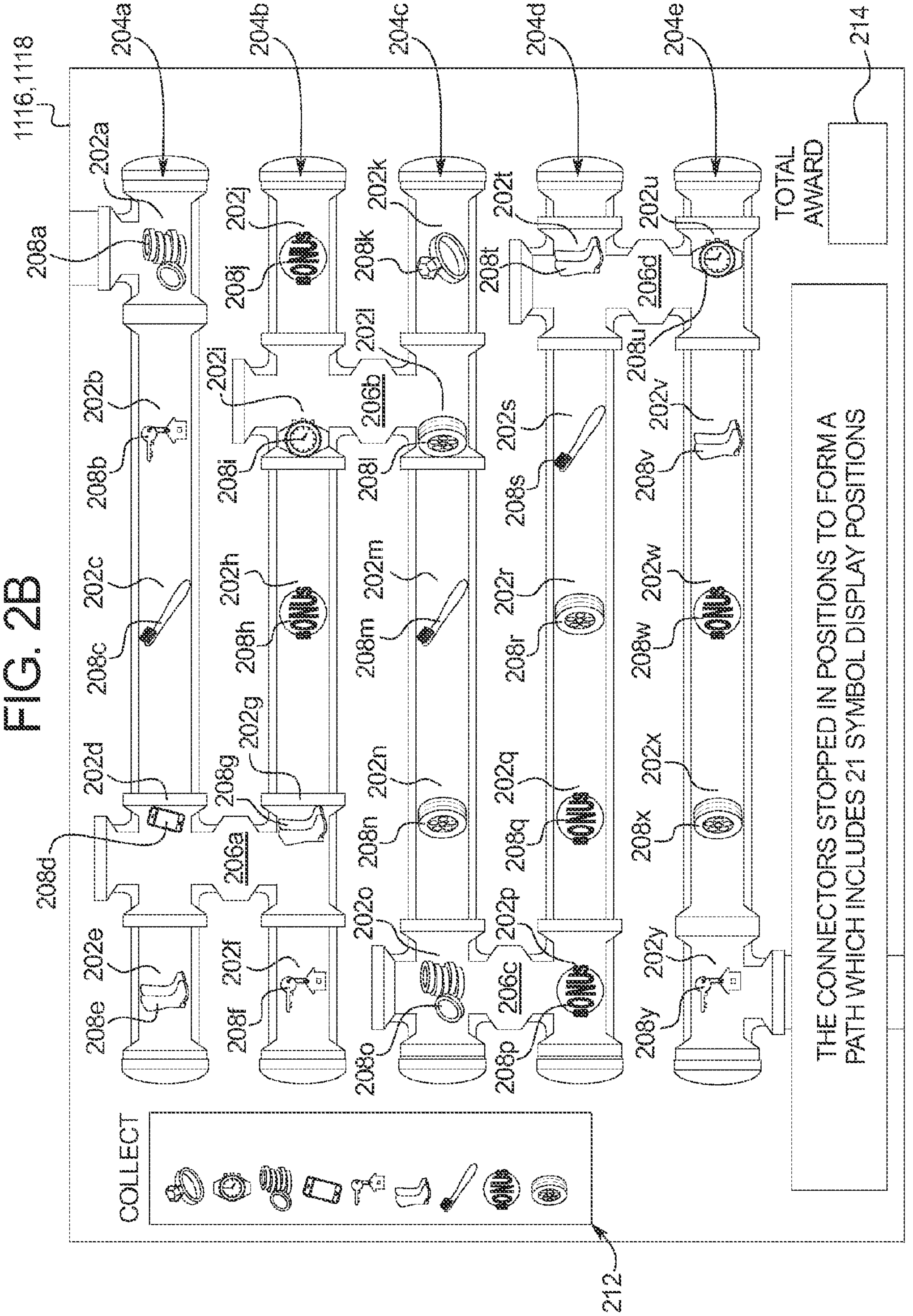

As seen in FIG. 2B, after displaying the plurality of symbol display positions, the gaming system randomly generates one of a plurality of symbols 208*a* to 208*y* at each of the symbol display positions. As further seen in FIG. 2B, the gaming system displays each connector randomly stopping at a separate position in the game area to connect different symbol display positions to form a displayed path of symbol display positions. For example, connector 206*a* stops at a position of the game area to connect symbol display position 202*d* of a first level of symbol display positions 204*a* with symbol display position 202*g* of a second level of symbol display positions 204*b*. In this example, the gaming system provides appropriate messages such as "THE CONNECTORS STOPPED IN POSITIONS TO FORM A PATH WHICH INCLUDES 21 SYMBOL DISPLAY POSITIONS" to the player visually, or through suitable audio or audiovisual displays.

Figure 2C:
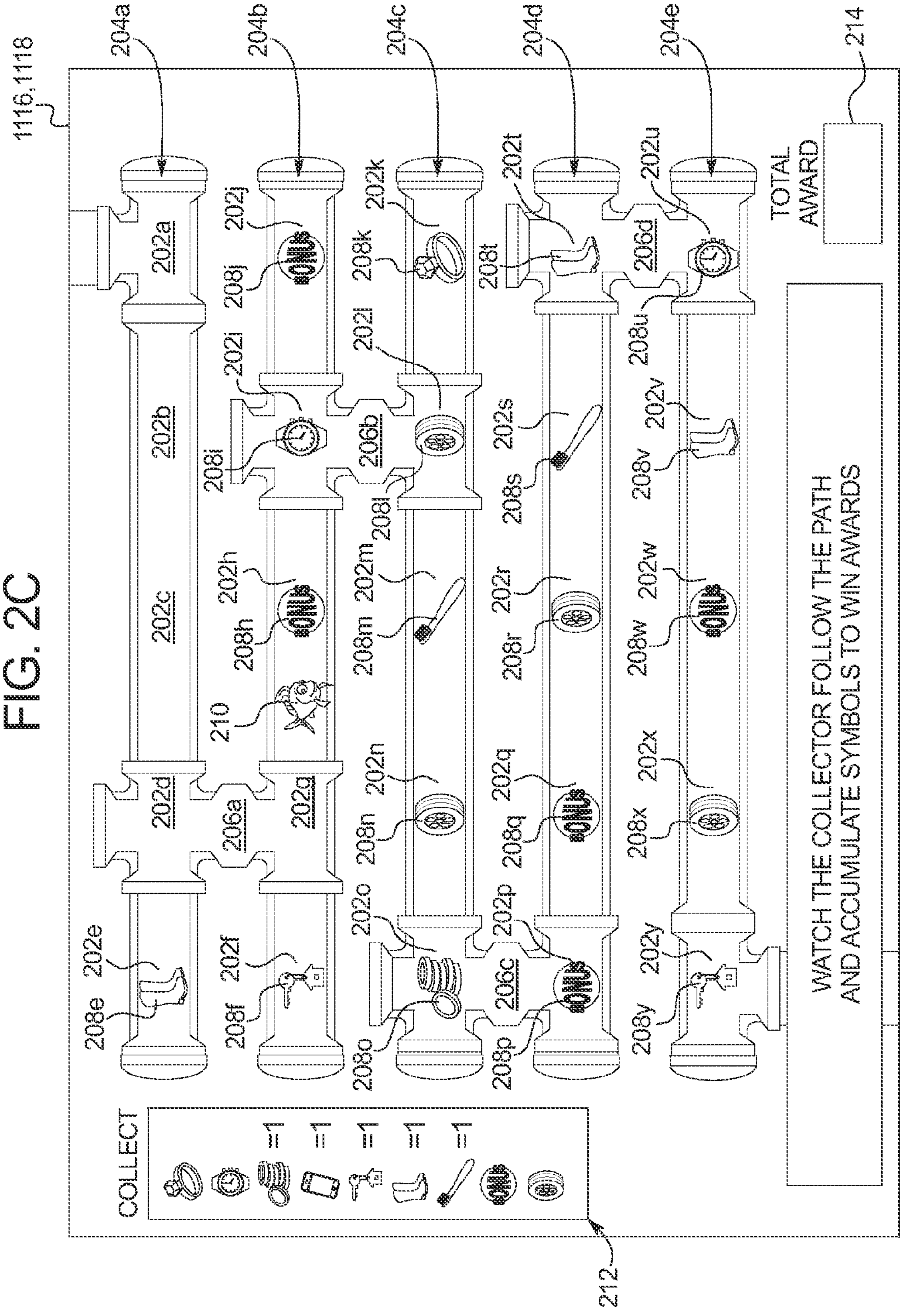

As seen in FIGS. 2C and 20, following the formation of the path and the generation of the symbols at each of the symbol display positions, the gaming system displays a collector 210 entering the path of symbol display positions (via the starting symbol display position) and moving through each of the symbol display positions of the path. Specifically, the gaming system displays the collector moving throughout the symbol display positions according to one or more collector movement rules, such as a rule that the collector moves toward the connector to any next level of symbol display positions and upon reaching the connector, moves through the connector to any next level of symbol display positions. As seen in FIGS. 2C and 20, the collector accumulates each of the symbols displayed at each of the symbol display positions until the collector reaches an ending symbol display position and exits the game area. In this example, as seen in FIG. 2C, the gaming system provides appropriate messages such as "WATCH THE COLLECTOR FOLLOW THE PATH AND ACCUMULATE SYMBOLS TO WIN AWARDS" to the player visually, or through suitable audio or audiovisual displays.

Figure 2D:
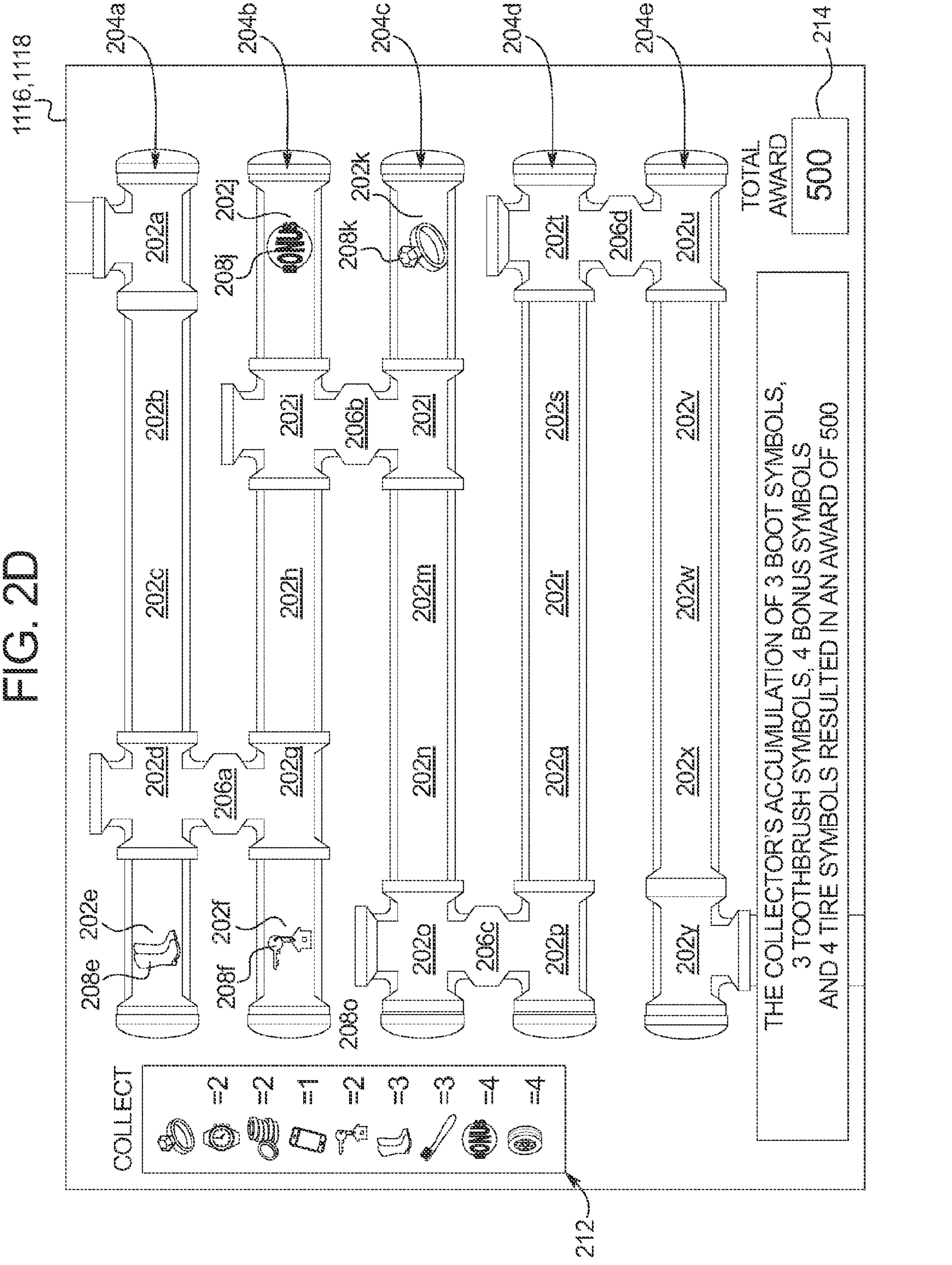

As seen in FIG. 2D, following the exit of the collector from the path of symbol display positions, the gaming system determines, based on the collected symbols, any awards to provide to the player. In this case, for collecting three boot symbols, three toothbrush symbols, four bonus symbols and four tire symbols, the gaming system provided an award of five-hundred credits to the player (as indicated in total award meter 214). In this example, the gaming system provides appropriate messages such as "THE COLLECTOR'S ACCUMULATION OF 3 BOOT SYMBOLS, 3 TOOTHBRUSH SYMBOLS, 4 BONUS SYMBOLS AND 4 TIRE SYMBOLS RESULTED IN AN AWARD OF 500" to the player visually, or through suitable audio or audiovisual displays.

In one embodiment, the gaming system utilizes a static or predetermined starting symbol display position. In another embodiment, the gaming system randomly determines the starting symbol display position determined from a plurality of different starting symbol display positions. In one embodiment, the gaming system utilizes a static or predetermined ending symbol display position. In another embodiment, the gaming system randomly determines the ending symbol display position from a plurality of different ending symbol display positions. In one embodiment, the gaming system utilizes one or more static or predetermined adjacent symbol display positions included in the path. In another embodiment, the gaming system randomly determines one or more of the adjacent symbol display positions included in the path.

In one embodiment, rather than determining the placement of the connectors (i.e., determining the path of symbol display positions) prior to the collector entering the game area, the gaming system determines the placement of one or more of the connectors while the collector moves throughout the symbol display positions. In this embodiment, as the collector approaches each different level of symbol display positions, the gaming system determines the position of the connector of the next level of symbol display positions to form the next part of the path.

In one embodiment, as described above, the gaming system employs one connector between each level or set of symbol display positions. In one such embodiment, the starting position and/or ending position of one or more connectors is based on one or more symbols accumulated or collected by the collector symbol. In this embodiment, which symbol display position of a first level or set of symbol display positions a connector is associated with or otherwise located at and/or which symbol display position of a second level or set of symbol display positions the connector is associated with or otherwise located at is based on one or more collected symbols.

In another embodiment, the gaming system employs two or more connectors between two or more level or sets of symbol display positions. In one such embodiment, since two connectors between two levels OF sets of symbol display positions corresponds to two different trails from one level of symbol display positions to the next level of symbol display positions, the direction of movement of the collector determines which trail of the path the collector will follow. In different embodiments, the gaming system selects which trail of the path the collector will follow based on: a random determination, a determination of which trail of the path is the shortest (i.e.; which trail of the path includes the lowest number of symbol display positions), a determination of which trail of the path is the longest (i.e., which trail of the path includes the highest number of symbol display positions), a determination of which trail of the path results in the highest payout (i.e., which trail of the path includes symbols associated with the highest cumulative award value), or a determination of which trail of the path results in the lowest payout (i.e., which trail of the path includes symbols associated with the lowest cumulative award value). In another such embodiment, since two connectors between two levels or sets of symbol display positions corresponds to two different trails of the path from one level of symbol display positions to the next level of symbol display positions, the gaming system enables the player to pick which trail of the path the collector will follow. In this embodiment, the gaming system employs an amount of player skill in determining which trail of the path the collector should travel.

In one embodiment, rather than utilizing the displayed connectors to form the path by connecting one or more symbol display positions, the gaming system associates each symbol display position with a displayed path forming elements, such as a path section, a wall, or an intersection. In this embodiment, the relationship of the path forming elements associated with the plurality of symbol display positions determines the displayed path of symbol display positions which the collector will visit and collect symbols at. In one such embodiment, after associating the symbol display positions with path forming elements, the gaming system enables the player to reposition one or more of the path forming elements to modify any formed path. In this embodiment, the gaming system employs an amount of player skill in repositioning the path forming elements to modify any formed path.

In another embodiment, one or more of the symbols generated at one or more of the symbol display positions include terminator symbols. In this embodiment, if the collector visits a symbol display position associated with a terminator symbol, the collector accumulates the terminator symbol and the gaming system ends or concludes that play of the path game.

Figure 3:
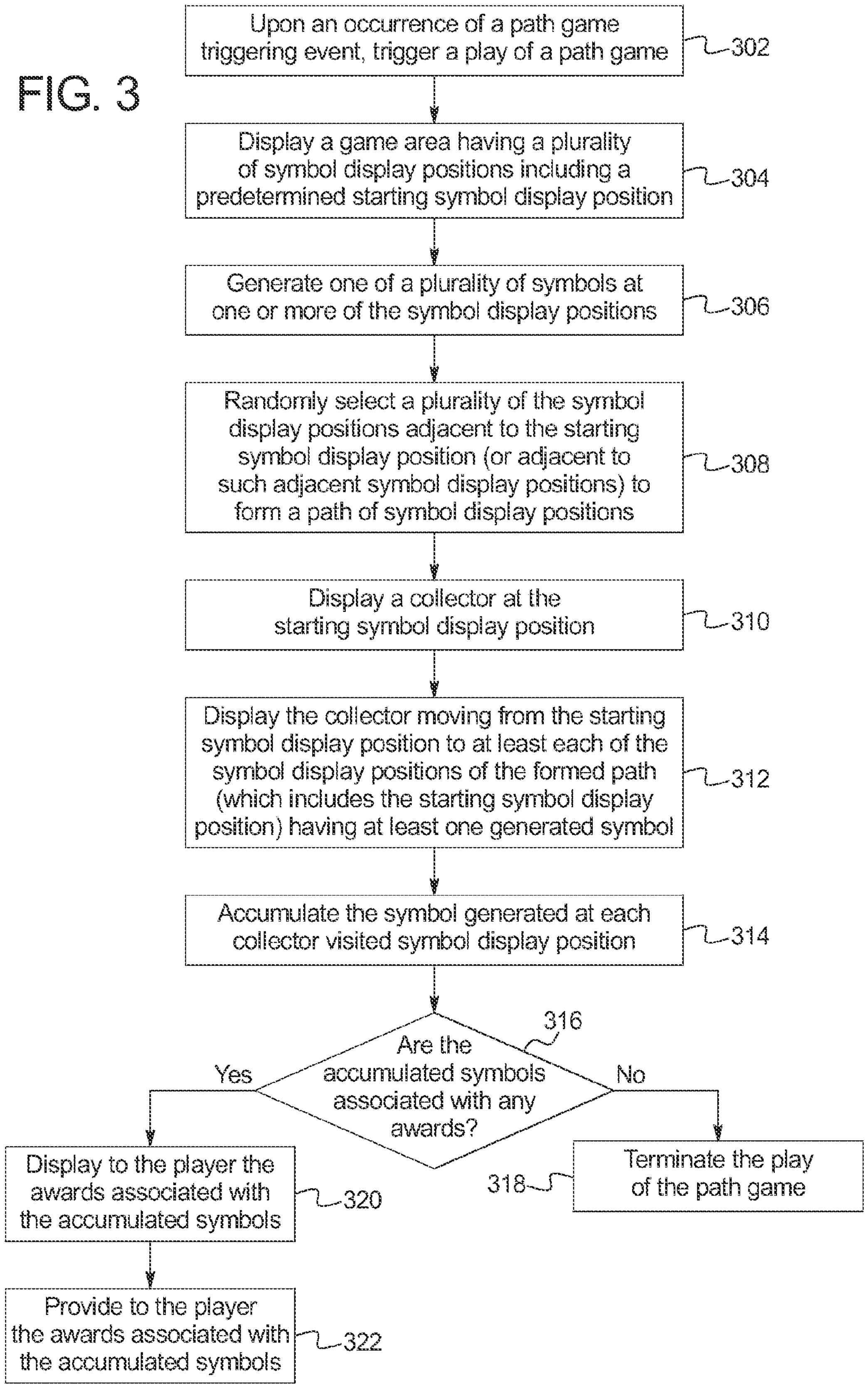
FIG. 3 is a flow chart of another example process for operating a gaming system providing one embodiment of another game employing a path.

Referring now to FIG. 3, a flowchart of another example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

In one embodiment, upon an occurrence of a path game triggering event, as indicated in block 302 of FIG. 3, the gaming system triggers a play of a path game. In one embodiment, the path game is a primary game wherein a path game triggering event occurs upon a player placing a wager to play the path game. In another embodiment, the path game is a secondary or bonus game wherein a path game triggering event occurs based on a displayed event associated with a wagered on play of a primary game. In another embodiment wherein the path game is a secondary or bonus game, a path game triggering event occurs based on an event independent of any displayed event associated with a wagered on play of a primary game.

In one embodiment, for the triggered path game, the gaming system displays a game area having plurality of symbol display positions including a predetermined or predefined starting symbol display position as indicated in block 304. In one such embodiment, the game area includes a grid configuration having a plurality of rows of symbol display positions and a plurality of columns of symbol display positions. In another such embodiment, the game area includes a non-grid configuration including a plurality of symbol display positions.

After displaying the game area including the plurality of symbol display positions, the gaming system generates one of a plurality of symbols at one or more of the symbol display positions as indicated in block 306.

In addition to generating one or more symbols at one or more of the symbol display positions, the gaming system randomly selects a plurality of the symbol display positions adjacent to the starting symbol display position (or adjacent to such adjacent symbol display positions) to form a path of symbol display positions as indicated in block 308. In one embodiment, as mentioned above, the gaming system forms the displayed path of symbol display positions by inserting one or more path forming elements, such as one or more walls, between one or more of the symbol display positions. The placement of such path forming elements (coupled with the non-placement of such path forming elements) creates or forms the path of symbol display positions including at least one symbol display position which is adjacent to the starting symbol display position). The formed path of symbol display positions includes the predetermined starting or entering symbol display position and a plurality of adjacent symbol display positions (wherein each symbol display position is adjacent to at least one other symbol display position).

In one embodiment, in addition to forming a path of symbol display positions including the predetermined starting symbol display position, the gaming system randomly selects a plurality of other, adjacent symbol display positions to form one or more other displayed paths of symbol display positions. In one such embodiment, the gaming system forms the additional path(s) of symbol display positions by inserting one or more path forming elements, such as one or more walls, between one or more of the symbol display positions wherein the placement of such path forming elements (coupled with the non-placement of such path forming elements) creates or forms the additional path(s) of symbol display positions. In this embodiment, none of these other paths of symbol display positions include the predetermined starting symbol display position.

In one embodiment, the gaming system randomly populates one or more of the symbol display positions with symbols independently from the gaming system's random determination of which symbol display positions to include in which path(s). In another embodiment, the gaming system determines, for each symbol display position, whether to populate that symbol display position with a symbol (and if so, which symbol) and also whether to connect that symbol display position with one or more other symbol display positions to form a path.

In addition to determining at least the path of symbol display positions including the starting symbol display position, the gaming system displays a collector or accumulator at the starting symbol display position as indicated in block 310 of FIG. 3.

After populating one or more symbol display positions with one or more symbols, randomly connecting different symbol display positions to form one or more displayed paths and displaying the connector at the starting symbol display position, the gaming system displays the collector moving from the starting symbol display position to at least each of the symbol display positions of the formed path (which includes the starting symbol display position) having at least one generated symbol as indicated in block 312.

As indicated in block 314, in association with displaying the collector moving to zero, one or more of the symbol display positions of the formed path (which includes the starting symbol display position), the gaming system accumulates each symbol generated at each collector visited symbol display position. That is, the gaming system displays the collector beginning at the starting symbol display position and moving throughout the formed path of symbol display positions adjacent to the starting symbol display position (or adjacent to such adjacent symbol display positions) while collecting the symbols generated at these visited symbol display positions.

Upon the collector or accumulator accumulating each of the generated symbols at each of the symbol display positions of the formed path of symbol display positions (which includes the starting symbol display position), the gaming system determines if the accumulated symbols are associated with any awards as indicated in diamond 316.

If the accumulated symbols are not associated with any awards, the gaming system terminates the play of the path game as indicated in block 318. On the other hand, if the accumulated symbols are associated with any awards, the gaming system displays such associated awards to the player and provides the player such associated awards as indicated in blocks 320 and 322. Such a configuration provides an increased level of excitement and enjoyment for players by determining the player's total path game award based on: (i) the determination of a quantity of symbol display positions to include in the path which includes the starting symbol display position, (ii) the determination of which symbol display positions to include in this path, and (iii) the plurality of determinations of which symbols to display at each of the symbol display positions included in the path.

Figure 4A:
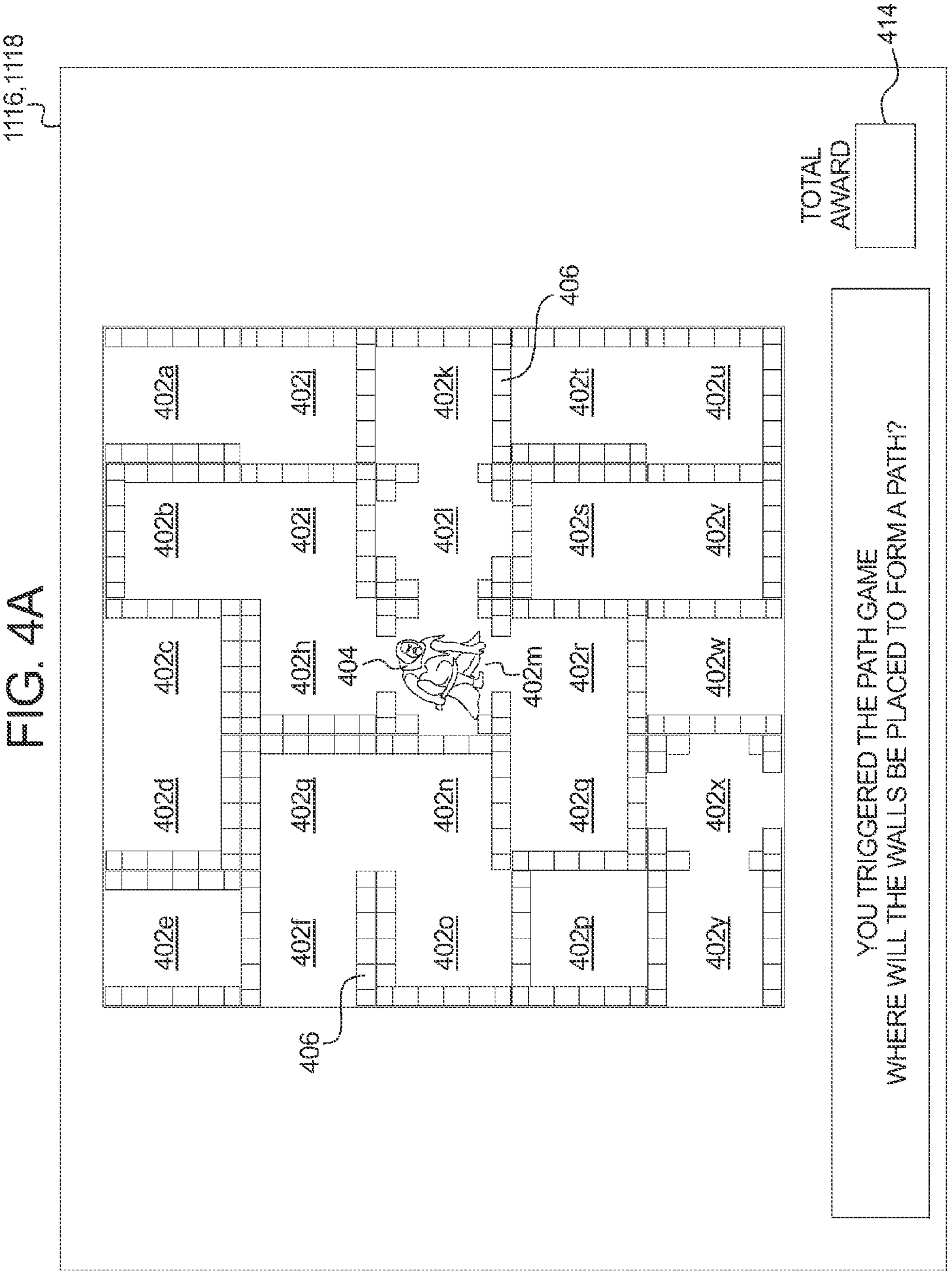
FIGS. 4A, 4B, 4C and 4D are front views of one embodiment of the gaming system disclosed herein illustrating a play of another example game which employs a determined path of symbol display positions.
Figure 4B:
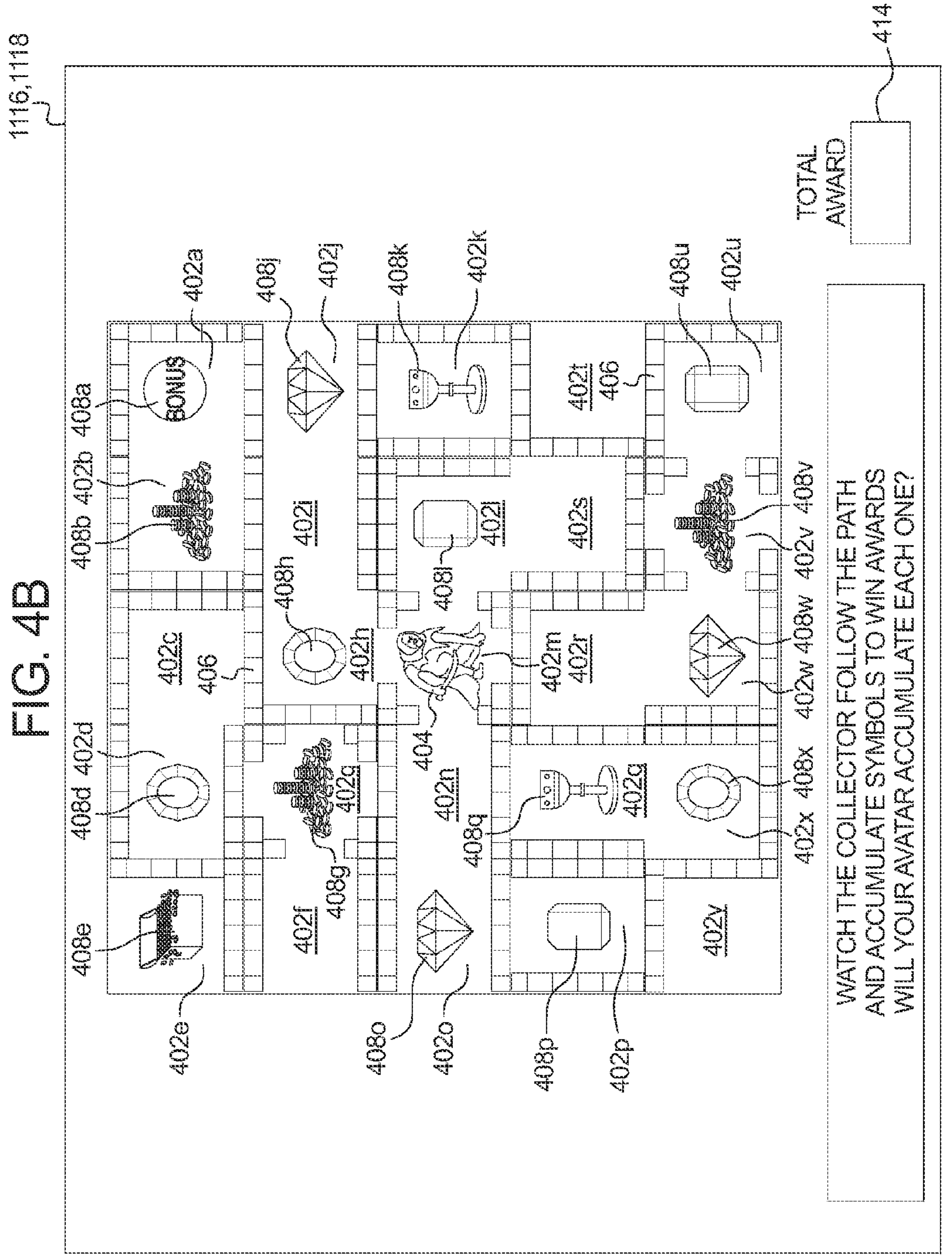

Turning to an example play of one embodiment of this path game, as seen in FIG. 4A, the gaming system initially displays a game area including a plurality of symbol display positions 402*a* to 402*y*, including a starting symbol display position 402*m*. In this example, the gaming system displays a collector 404 initially positioned at the starting symbol display position 402*m*. The gaming system of this embodiment displays a plurality of path forming elements, such as walls 406, adjacent to or bordering certain of the symbol display positions. The initially placement of these path forming elements provides that the symbol display positions are initially arranged in a plurality of randomly determined paths, wherein at least one of the displayed path(s) includes the starting symbol display position. In this example, the gaming system provides appropriate messages such as "YOU TRIGGERED THE PATH GAME" and "WHERE WILL THE WALLS BE PLACED TO FORM A PATH?" to the player visually, or through suitable audio or audiovisual displays.

As seen in FIG. 43, for this play of the path game, the gaming system rearranges the path forming elements, such as walls 406, to form a plurality of different paths of symbol display positions. In this illustrated example, zero, one or more paths of symbol display positions include one or more branches of symbol display positions. As also seen in FIG. 43, in addition to forming one or more paths, the gaming system populates one or more symbols 408 at one or more of the symbol display positions 402. In different embodiments, the rearrangement of the path forming elements includes moving one or more path forming elements, adding one or more path forming elements and/or removing one or more path forming elements. It should be appreciated that the starting symbol display position (which initially displays collector 404) is included in a path regardless of the rearrangement of the path forming elements and further regardless of the quantity of other symbol display positions included in such a path. In this example, the gaming system provides appropriate messages such as "WATCH THE COLLECTOR FOLLOW THE PATH AND ACCUMULATE SYMBOLS TO WIN AWARDS" and "WILL YOUR AVATAR ACCUMULATE EACH ONE?" to the player visually, or through suitable audio or audiovisual displays.

Figure 4C:
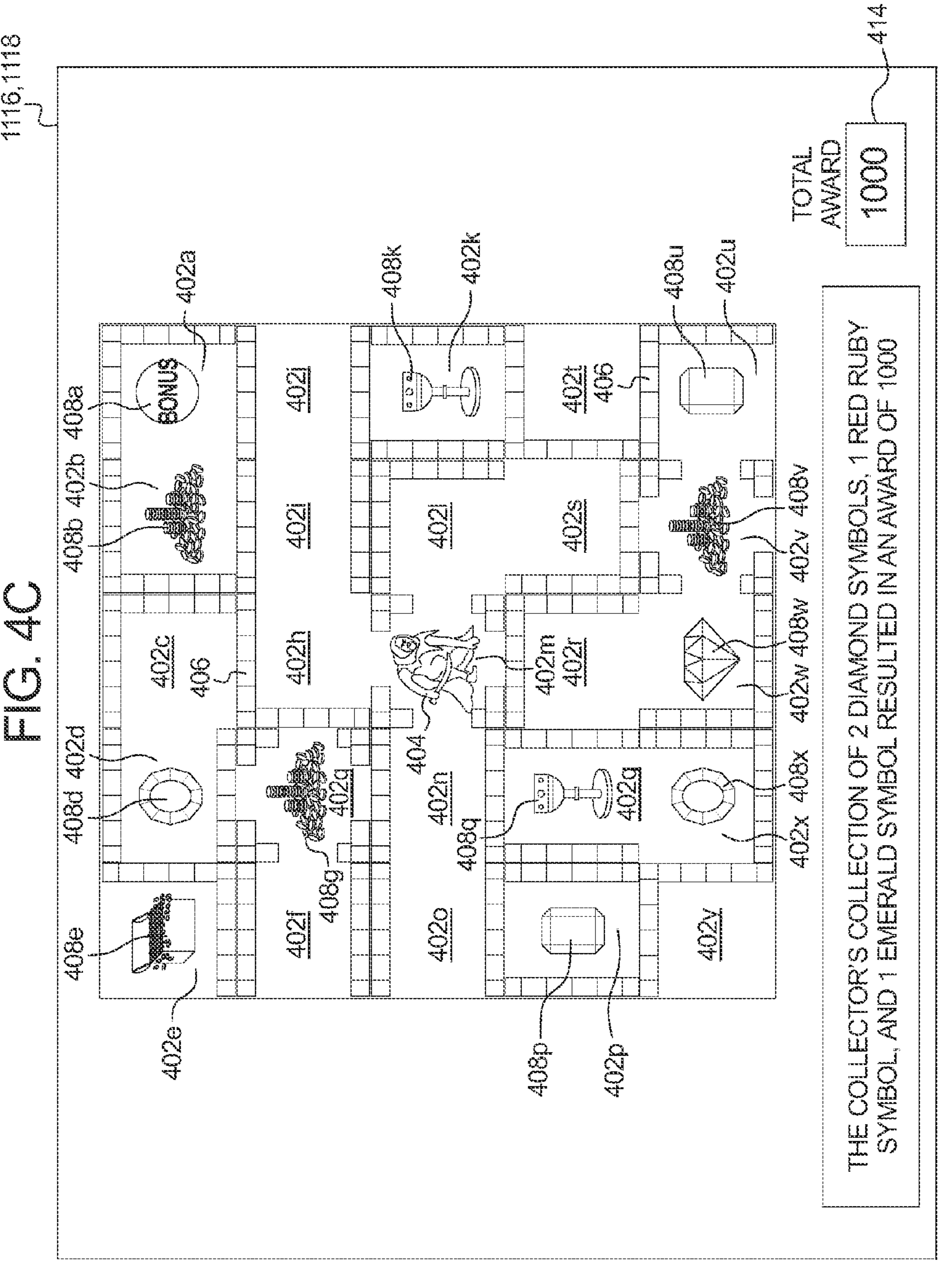

As seen in FIG. 4C, after forming one or more paths of symbol display positions and generated one or more symbols at one or more of such symbol display positions, the gaming system displays the collector 404 moving to each of the symbol display positions of the path which includes the starting symbol display position. Specifically, the gaming system displays the collector moving throughout the symbol display positions according to one or more collector movement rules. As seen in FIG. 40, the collector accumulates each of symbols displayed at each of the symbol display positions until no more symbols remain at the symbol display positions of the collector's path. In this example, the gaming system determines, based on the collected symbols, any awards to provided to the player. In this case, for collecting two diamond symbols, one red ruby symbol, and one emerald symbol, the gaming system provided an award of one-thousand credits to the player (as indicated in total award meter 414). In this example, the gaming system provides appropriate messages such as "THE COLLECTOR'S COLLECTION OF 2 DIAMOND SYMBOLS, 1 RED RUBY SYMBOL, AND 1 EMERALD SYMBOL RESULTED IN AN AWARD OF 1000" to the player visually, or through suitable audio or audiovisual displays.

Figure 4D:
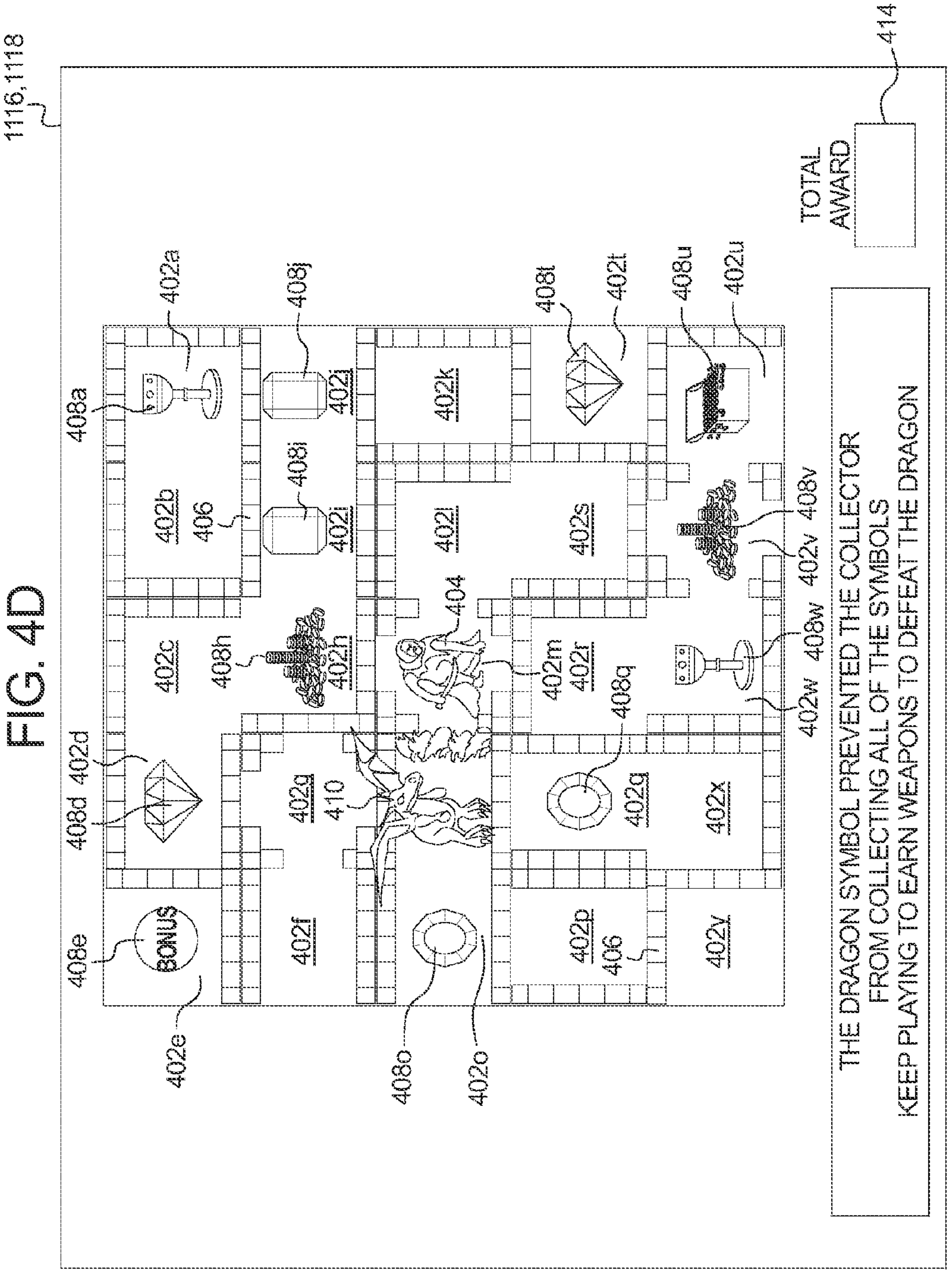

In one embodiment, in addition to forming the path of symbol display positions and populating the symbol display positions with symbols, the gaming system populates one or more of the symbol display positions with blocking symbols. For example, as seen in FIG. 4D, although the gaming system formed a path of symbol display positions which including the collector 404 and at least one collectable symbol, the gaming system also generated a blocking symbol 410, illustrated as a dragon symbol, which prevents the collector from visiting each of the symbol display positions of the formed path. Such an embodiment provides an increased level of excitement for certain players by causing one or more symbol display positions (and thus one or more symbols associated with one or more awards) to be initially accessible and then subsequently inaccessible. In this example, the gaming system provides appropriate messages such as "THE DRAGON SYMBOL PREVENTED YOU FROM COLLECTING ALL OF THE SYMBOLS" and "KEEP PLAYING TO EARN WEAPONS TO DEFEAT THE DRAGON" to the player visually, or through suitable audio or audiovisual displays.

In one embodiment employing blocking symbols, the gaming system determines whether or not the blocking symbol will block the collector's movement along the formed path. In one such embodiment, depending on the occurrence of a blocking symbol path blocking event, the blocking symbol periodically blocks the collector's movement along the formed path and also periodically enables the collector to move past the blocking symbol. In another embodiment employing blocking symbols, zero, one or more of the generated symbols are anti-blocking symbols. In this embodiment, if an anti-blocking symbol is accumulated prior to the collector visiting a symbol display position with a generated blocking symbol, the gaming system causes the anti-blocking symbol to nullify the blocking effects of the blocking symbol and thus enable the collector to move past that symbol display position.

In another such embodiment employing blocking symbols, the gaming system causes one or more blocking symbols to move to different symbol display positions of the formed path. In this embodiment, a determination of whether a collector accumulates each of the symbols of the symbol display positions of the formed path is based on, relative to the location(s) of the collector, which symbol display positions of the formed path the blocking symbol moves to and when the blocking symbol moves to such locations.

Figure 5:
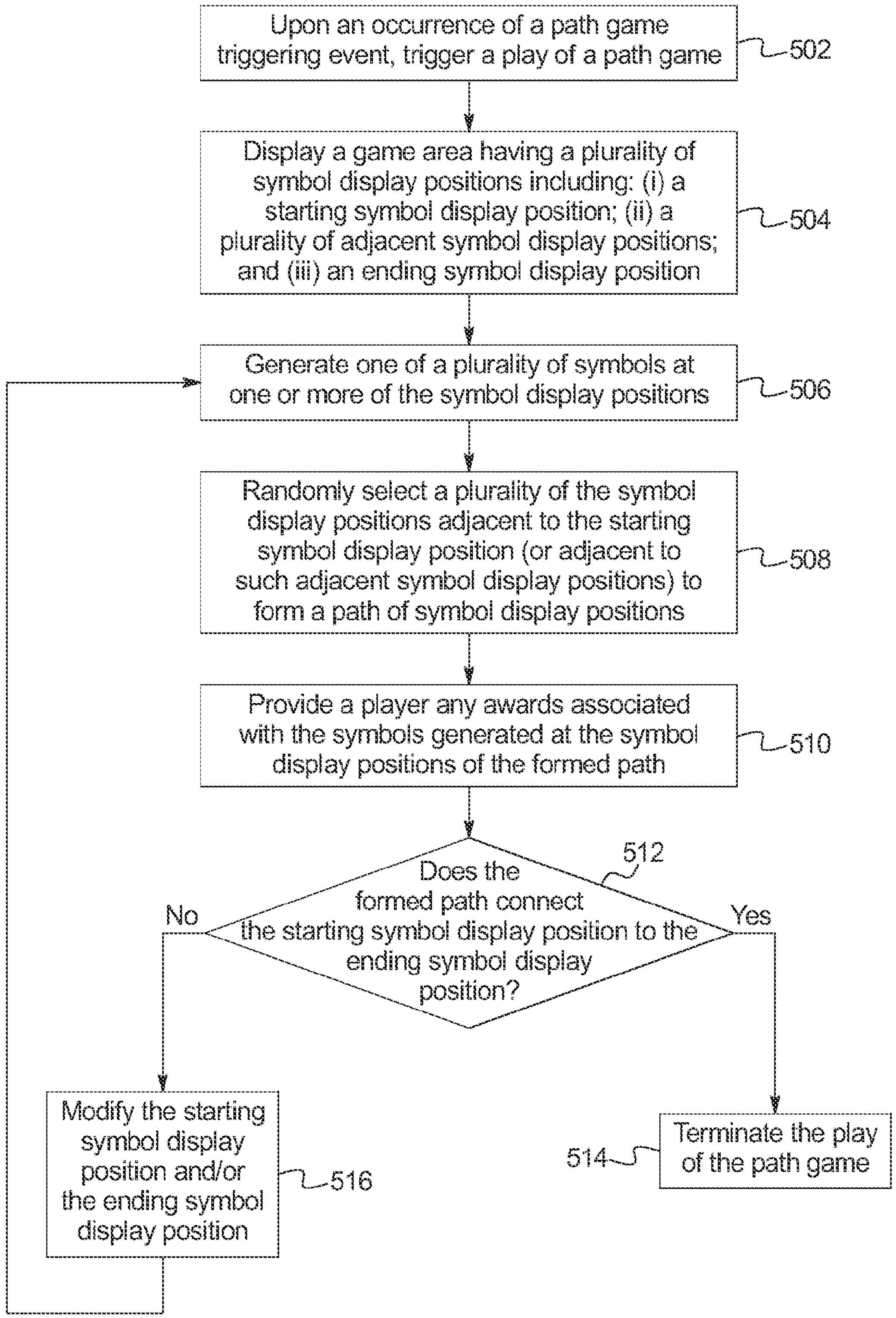
FIG. 5 is a flow chart of another example process for operating a gaming system providing one embodiment of another game employing a path.

Referring now to FIG. 5, a flowchart of another example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 5, it should be appreciated that many other methods of performing the acts associated with this process may be used. For example, the order of certain steps described may be changed, or certain steps described may be optional.

In one embodiment, upon an occurrence of a path game triggering event, as indicated in block 502 of FIG. 5, the gaming system triggers a play of a path game. As described above, in different embodiments: (i) the path game is a primary game wherein a path game triggering event occurs upon a player placing a wager to play the path game; (ii) the path game is a secondary or bonus game wherein a path game triggering event occurs based on a displayed event associated with a wagered on play of a primary game; or (iii) the path game is a secondary or bonus game, a path game triggering event occurs based on an event independent of any displayed event associated with a wagered on play of a primary game.

In one embodiment, for the triggered path game, the gaming system displays a game area having plurality of symbol display positions including: (i) a starting or entering symbol display position; (ii) a plurality of adjacent symbol display positions (wherein each symbol display position is adjacent to at least one other symbol display position); and (iii) an ending or exit symbol display position as indicated in block 504. In one such embodiment, the game area includes a grid configuration having a plurality of rows of symbol display positions and a plurality of columns of symbol display positions. In another such embodiment, the game area includes a non-grid configuration including a plurality of symbol display positions.

After displaying the game area including the plurality of symbol display positions, the gaming system generates or associates one of a plurality of symbols at one or more of the symbol display positions as indicated in block 506. In one such embodiment, one or more of the symbols are each associated with an individual award. In another such embodiment, a plurality of the symbols are each associated with an individual award.

In addition to generating one or more symbols at one or more of the symbol display positions, the gaming system randomly selects a plurality of the symbol display positions adjacent to the starting symbol display position (or adjacent to such adjacent symbol display positions) to form a path of symbol display positions as indicated in block 508.

Following the formation of the path of symbol display positions, the gaming system provides the player any awards associated with the symbols generated at the symbol display positions of the formed path as indicated in block 510. In one such embodiment, the gaming system displays a collector or accumulator visiting each of the symbol display positions of the formed path and accumulating any awards associated with any visited symbol display positions.

Following the accumulation of any awards associated with the symbols generated at the symbol display positions of the formed path, the gaming system determines if the formed path connects the starting symbol display position to the ending symbol display position as indicated in diamond 512.

If the formed path of symbol display positions connects the starting symbol display position to the ending symbol display position, as indicated in block 514, the gaming system terminates the play of the path game.

On the other hand, if the formed path of symbol display positions does not connect the starting symbol display position to the ending symbol display position, as indicated in block 516, the gaming system modifies the starting symbol display position and/or the ending symbol display position.

In one such embodiment, the gaming system modifies the starting symbol display position by reclassifying one or more symbol display positions which are adjacent to the starting symbol display position as starting symbol display positions. That is, the gaming system modifies the starting symbol display position to include a plurality of the symbol display positions of the matrix. In another such embodiment, the gaming system modifies the ending symbol display position by reclassifying one or more symbol display positions which are adjacent to the ending symbol display position as ending symbol display positions. That is, the gaming system modifies the ending symbol display position to include a plurality of the symbol display positions of the matrix. In another such embodiment, the gaming system: (i) modifies the starting symbol display position by reclassifying one or more symbol display positions which are adjacent to the starting symbol display position as starting symbol display positions, and (ii) modifies the ending symbol display position by reclassifying one or more symbol display positions which are adjacent to the ending symbol display position as ending symbol display positions.

Following such a reclassification, the gaming system returns to block 506 and regenerates or reassociates a symbol at one or more of the symbol display positions, reforms a path of symbol display positions (which begins at the starting symbol display position (or the modified starting symbol display position) and includes one or more of the adjacent symbol display positions) and determines whether the formed path connects the starting symbol display position (or the modified starting symbol display position) with the ending symbol display position (or the modified ending symbol display position).

Such a process continues until the formed path connects the starting symbol display position (or the modified starting symbol display position) with the ending symbol display position (or the modified ending symbol display position) and the play of this path game ends. This configuration provides an increased level of excitement and enjoyment for certain players by potentially enabling the player to participate in many iterations of the path game (i.e., many paths are formed) and thus provides players with the opportunity to win multiple awards for a single play of the path game. Such a configuration also provides an increased level of excitement and enjoyment for players by determining the awards provided to the player based on the quantity of different paths formed and the symbols (and/or awards) associated with the symbol display positions of the various formed paths.

Figure 6A:
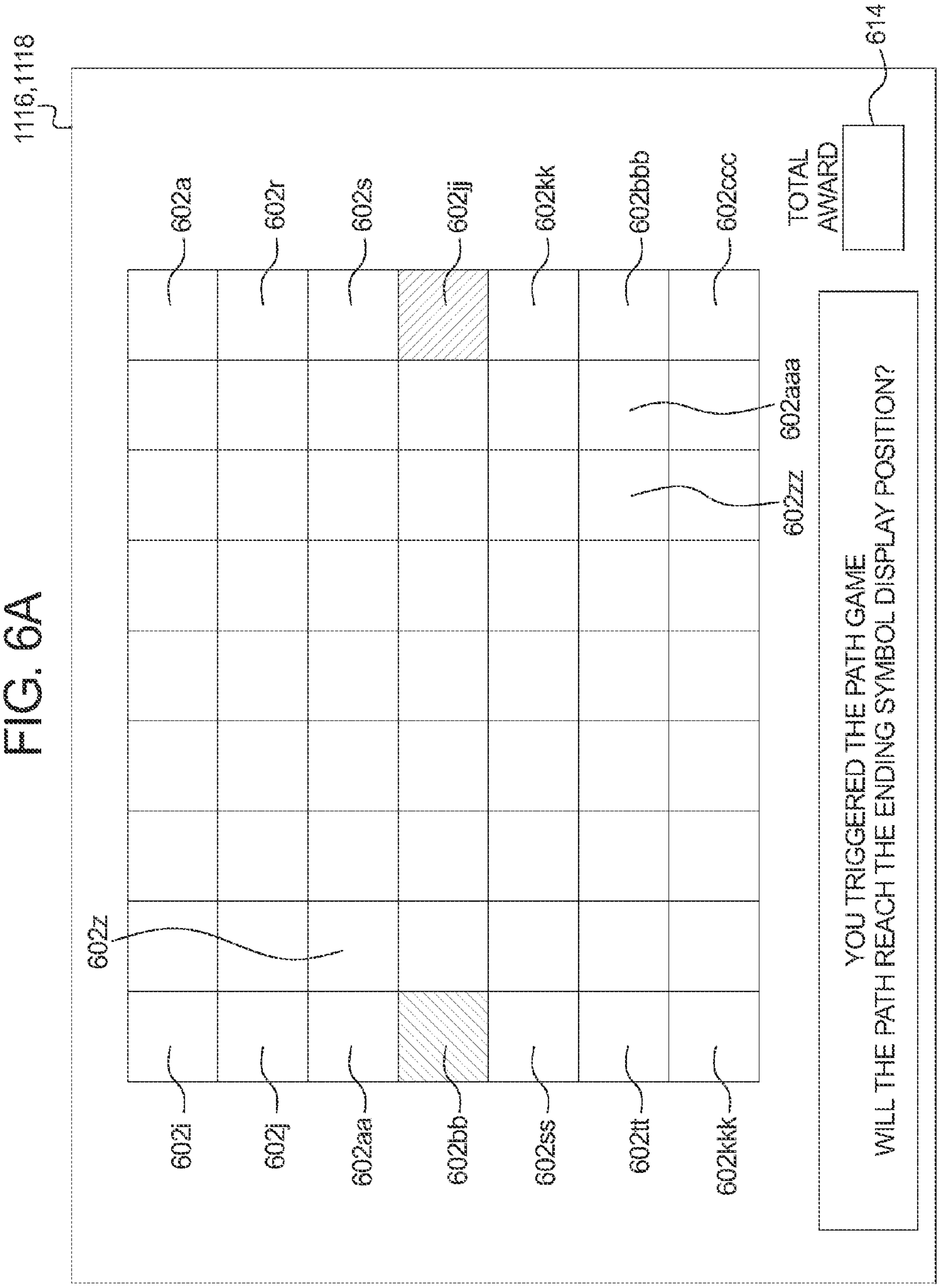
FIGS. 6A, 6B, 6C and 6D are front views of one embodiment of the gaming system disclosed herein illustrating a play of another example game which employs a randomly determined path of symbol display positions.

Turning to an example play of one embodiment of this path game, as seen in FIG. 6A, the gaming system initially displays a game area including a plurality of symbol display positions 602*a* to 602*kkk*, including one initial starting symbol display position 602*jj* and one initial ending symbol display position 602*aa*. In this example, the gaming system provides appropriate messages such as YOU TRIGGERED THE PATH GAME" and "WILL THE PATH REACH THE ENDING SYMBOL DISPLAY POSITION?" to the player visually, or through suitable audio or audiovisual displays.

Figure 6B:
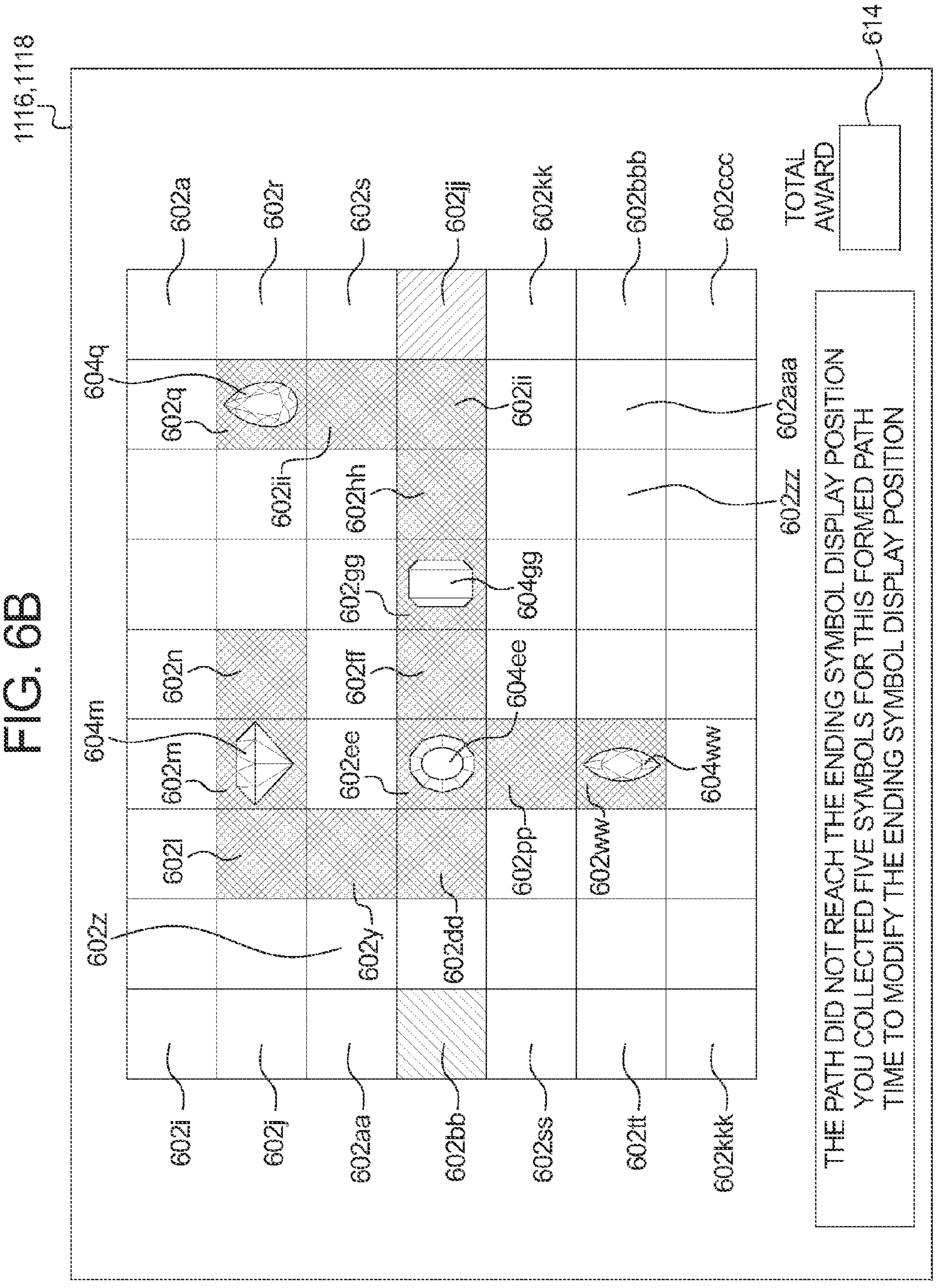

As seen in FIG. 6B, for this play of the path game, the gaming system selects a plurality of the symbol display positions adjacent to the starting symbol display position 602*ii* and 602*t* and selects a plurality of the symbol display positions adjacent to such selected symbol display positions 602*q*, 602*hh*, 602*gg*, 602*ff*, 602*ee*, 602*dd*, 602*y*, 602*l*, 602*m*, 602*n*, 602*pp* and 602*ww* to form a displayed path of symbol display positions. In this example, the gaming system accumulates symbols 604*q*, 604*m*, 604*ee*, 604*gg* and 604*ww* of the five selected symbol display positions of the formed path which are associated with symbols. In one such example (not shown), the gaming system displays a collector or accumulating moving to each of the symbol display positions of the formed path and accumulating the symbols displayed at such visited symbol display positions. Following such an accumulation of any revealed symbols, the gaming system determines that the formed path did not connect the starting symbol display position 602*jj* with the ending symbol display position 602*bb* and thus a modification of the ending symbol display position will occur. In this example, the gaming system provides appropriate messages such as "THE PATH DID NOT REACH THE ENDING SYMBOL DISPLAY POSITION" and "TIME TO MODIFY THE ENDING SYMBOL DISPLAY POSITION" to the player visually, or through suitable audio or audiovisual displays.

Figure 6C:
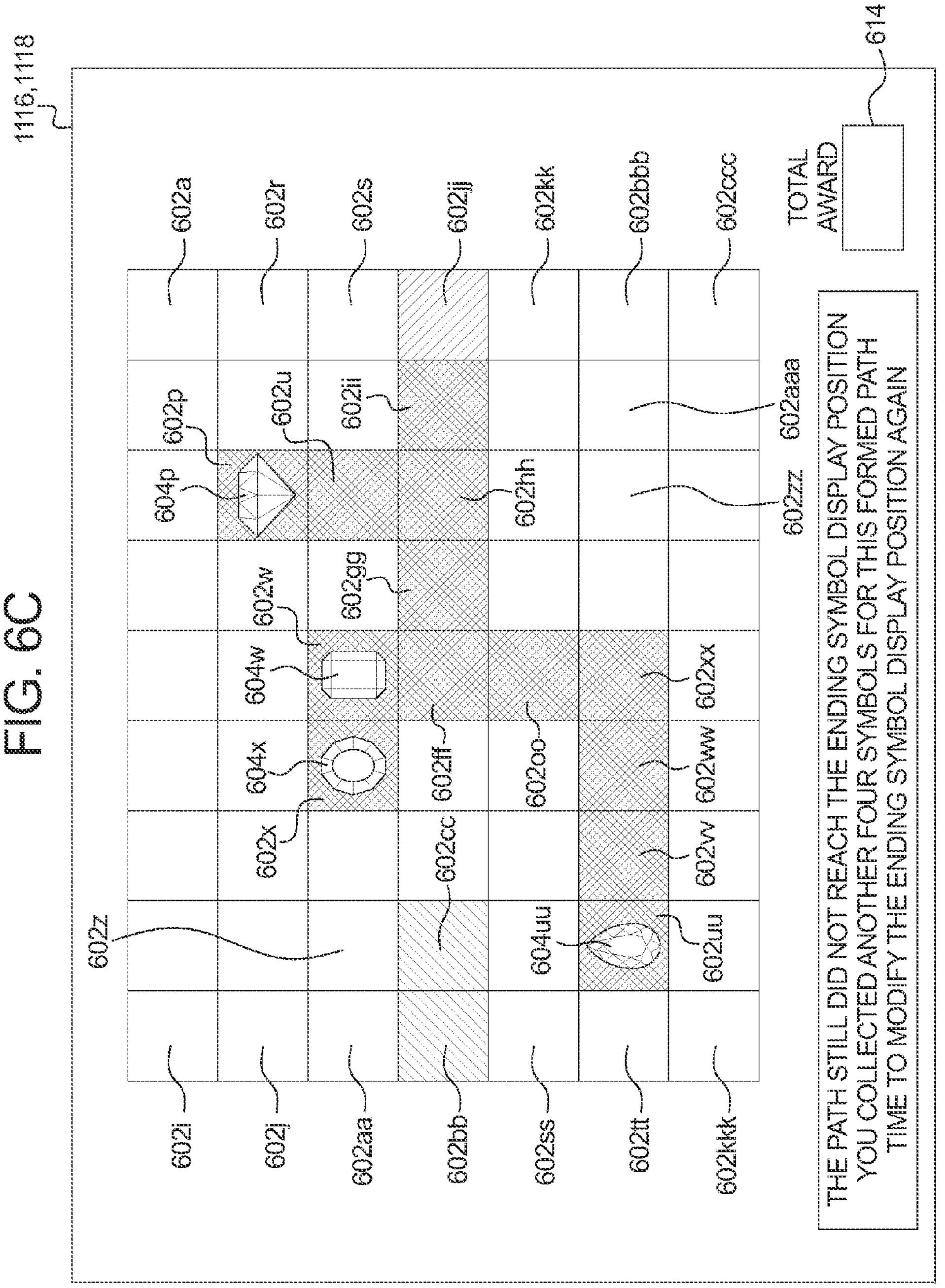

As seen in FIG. 6C, following the previous determination that the previous formed path (i.e., the formed path of FIG. 6B) did not connect the starting symbol display position 602*jj* with the ending symbol display position 602*bb*, the gaming system modified the ending symbol display position to include both symbol display position 602*bb* and symbol display position 602*cc*. As also seen in FIG. 6C, the gaming system reassociates one or more of the symbol display positions with one or more symbols. As further seen in FIG. 6C, the gaming system selects a symbol display position adjacent to the starting symbol display position 602*ii* and selects another plurality of the symbol display positions adjacent to such selected symbol display positions 602*ff*, 602*gg*, 602*hh*, 602*u*, 602*p*, 602*oo*, 602*xx*, 602*uu*, 602*vv*, 602*ww*, 602*w* and 602*x* to form another displayed path of symbol display positions. In this example, the gaming system accumulates symbols 604*p*, 604*w*, 604*x*, 604*u*, of the four selected symbol display positions of this formed path which are associated with symbols. Following such an accumulation of any revealed symbols, the gaming system determines that the formed path did not connect the starting symbol display position 602*jj* with the modified ending symbol display positions 602*bb* and 602*cc* and thus another modification of the ending symbol display position will occur. In this example, the gaming system provides appropriate messages such as "THE PATH STILL DID NOT REACH THE ENDING SYMBOL DISPLAY POSITION", "YOU COLLECTED ANOTHER FOUR SYMBOLS FOR THIS FORMED PATH" and "TIME TO MODIFY THE ENDING SYMBOL DISPLAY POSITION AGAIN" to the player visually, or through suitable audio or audiovisual displays.

Figure 6D:
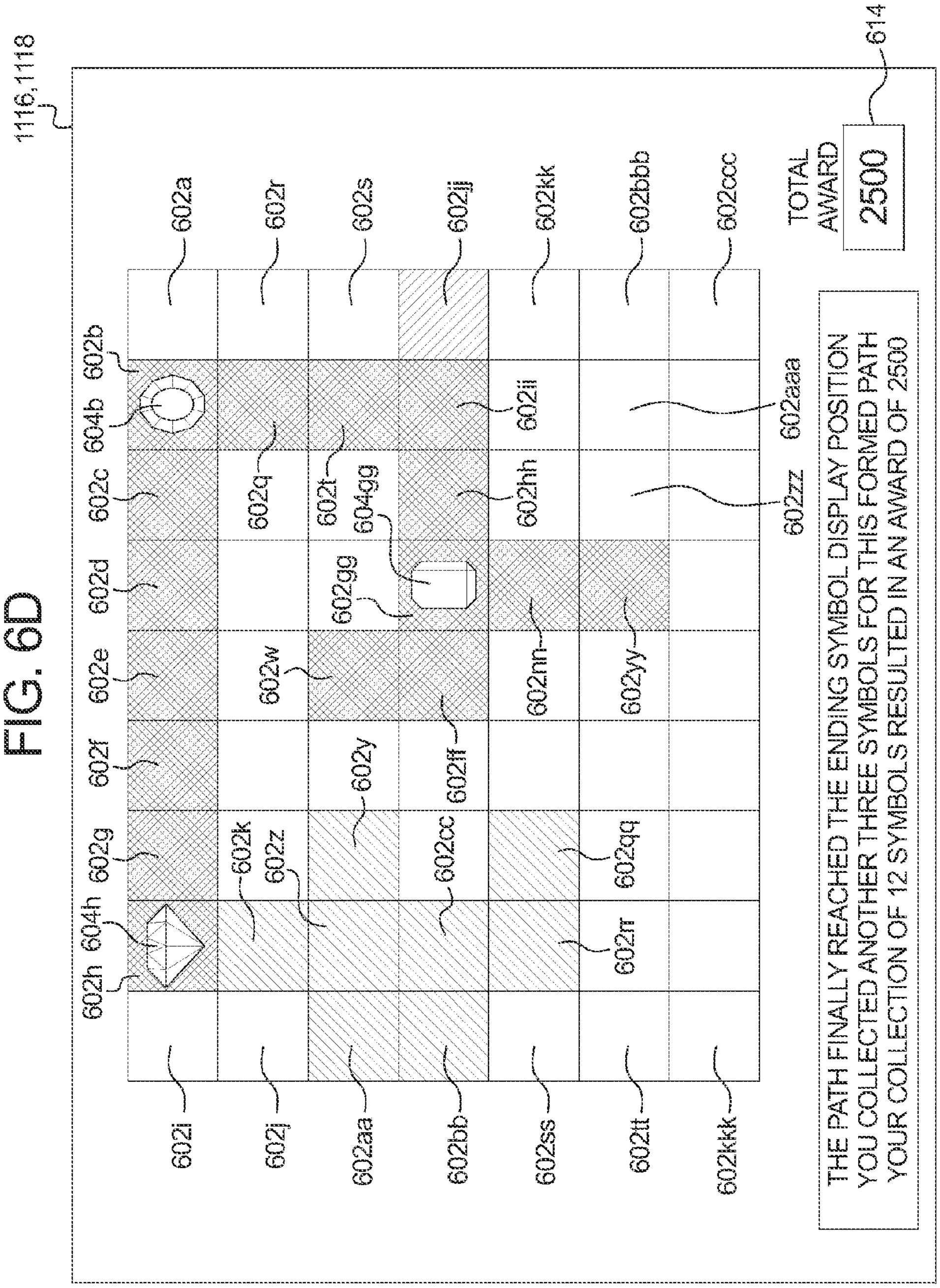

As seen in FIG. 6D, following six additional determinations that the previous formed paths did not connect the starting symbol display position with the ending symbol display position (and thus following six previous modifications to the ending symbol display position), the gaming system again reassociates one or more of the symbol display positions with one or more symbols. As seen in FIG. 6D, the gaming system selects another plurality of symbol display positions adjacent to the starting symbol display position 602*ii* and 602*t* and selects another plurality of the symbol display positions adjacent to such selected symbol display positions 602*ff*, 602*gg*, 602*hh*, 602*w*, 602*nn*, 602*yy*, 602*q*, 602*b*, 602*c*, 602*d*, 602*e*, 602*f*, 602*g* and 602*h* to form another displayed path of symbol display positions. In this example, the gaming system accumulates symbols 604*b*, 604*h* and 604*gg* of the three selected symbol display positions of this formed path which are associated with symbols. Following such an accumulation of any associated symbols, the gaming system determines that the formed path connects the starting symbol display position 602*jj* with the modified ending symbol display positions (at this point in time, including symbol display positions 602*bb*, 602*cc*, 602*rr*, 602*qq*, 602*aa*, 602*z*, 602*y* and 602*k*). Accordingly, the gaming system provides the player an award of two-thousand-five hundred credits associated with the accumulated symbols (as indicated in total award meter 614) and terminates this play of the path game. In this example, the gaming system provides appropriate messages such as "THE PATH FINALLY REACHED THE ENDING SYMBOL DISPLAY POSITION", "YOU COLLECTED ANOTHER THREE SYMBOLS FOR THIS FORMED PATH" and "YOUR COLLECTION OF 12 SYMBOLS RESULTED IN AN AWARD OF 2500" to the player visually, or through suitable audio or audiovisual displays.

In one embodiment, as described above, for each formation of a path of symbol display positions, the gaming system repopulates the matrix of symbol display positions with symbols (and/or awards). In this embodiment, each time the path of symbol display positions does not connect the starting symbol display position with the ending symbol display position, the gaming system associates one or more symbols (and/or one or more awards) with one or more of the symbol display positions. In another embodiment, the gaming system associates one or more symbols (and/or one or more awards) with one or more of the symbol display positions at the initiation of the play of the path game. In this embodiment, if a path of symbol display positions includes a symbol display position associated with one of such symbols (and/or one of such awards) and the path does not connect the starting symbol display position and the ending symbol display position, the gaming system eliminates or otherwise removes this symbol (and/or award) from the matrix of symbol display positions.

In one embodiment, as described above, for each formation of a path of symbol display positions, the gaming system accumulates any symbols (and/or awards) associated with the symbol display positions of the formed path and provides the player any awards associated with the accumulated symbols (and/or awards). In another embodiment, if a formed path connects the starting symbol display position and the ending symbol display position, then the gaming system accumulates any symbols (and/or awards) associated with the symbol display positions of the formed path and provides the player any awards associated with the accumulated symbols (and/or awards).

In another embodiment, in addition to or as an alternative to providing the player any awards based on any symbols (and/or awards) accumulated from the symbol display positions of one or more formed paths, the gaming system determines an award based on the modifications to the starting symbol display position and/or the ending symbol display position. In one such embodiment, the gaming system determines an award based on the quantity of symbol display positions added to the ending symbol display position. In another such embodiment, the gaming system determines an award based on the quantity of symbol display positions added to the starting symbol display position. In another such embodiment, the gaming system determines an award based on the quantity of symbol display positions added to the starting symbol display position and to the ending symbol display position.

In another embodiment, rather than selecting a plurality of symbol display positions branching off of the starting symbol display position, for each iteration of the game, the gaming system modifies the starting symbol display position and/or the ending symbol display position. In one such embodiment, this modification includes adding one or more symbol display positions to the respective starting symbol display position or ending symbol display position. In these embodiment, if at least one of the symbol display positions of the starting symbol display position connects with at least one of the symbol display positions of the ending symbol display position, the gaming system terminates the play of this game. On the other hand, if none of the symbol display positions of the starting symbol display position connect with any of the symbol display positions of the ending symbol display position, the gaming system further modifies the starting symbol display position and/or the ending symbol display position and again determines if at least one of the symbol display positions of the starting symbol display position connects with at least one of the symbol display positions of the ending symbol display position.

In another embodiment, for one or more of the path games disclosed herein, the gaming system generates a symbol at each of the symbol display positions. In another embodiment, the gaming system generates a symbol at a plurality of the symbol display positions. In another embodiment, for one or more of the path games disclosed herein, the gaming system generates one of a plurality of symbols or one of a plurality awards at each of the symbol display positions. In another embodiment, for one or more of the path games disclosed herein, the gaming system generates one of a plurality of awards at each of the symbol display positions. In another embodiment, for one or more of the path games disclosed herein, the gaming system generates a plurality of symbols (and/or awards) at one or more of the symbol display positions. In this embodiment, if a collector visits a symbol display position with a plurality of symbols (and/or awards), the gaming system accumulates one, more or each of the plurality of symbols (and/or awards) at that visited symbol display position.

In different embodiments, the symbols (and/or awards) associated with one or more of the symbol display positions are associated with or otherwise correspond to one or more of: credit amounts, modifiers (e.g., multipliers), physical prizes, free spins, progressive awards, values, virtual goods associated with the gaming system, virtual goods not associated with the gaming system, a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In another embodiment, for one or more of the path games disclosed herein, one or more of the symbols generated at one or more of the symbol display positions are masked symbols. In this embodiment, the gaming system reveals or unmasks any accumulated symbols after the collector concludes accumulating such symbols. For example, the gaming system displays each symbol at each symbol display position as a question mark symbol wherein after the collector reaches the ending symbol display position (and after one or more question mark symbols have been accumulated), the gaming system reveals which symbols are associated with which collected question mark symbols. In another embodiment, for one or more of the path games disclosed herein, one or more of the symbols generated at one or more of the symbol display positions are partially masked symbols. In this embodiment, the gaming system displays part, but not all, of the identifying information associated with the symbol at one or more of the symbol display positions.

In another embodiment, rather than displaying each of the symbol display positions (including the symbol display positions not included in the path of symbol display positions), for one or more of the path games disclosed herein, the gaming system selectively displays certain of the symbol display positions. In one such embodiment, the gaming system displays the symbol display positions which the collector has visited (and masks or does not fully display the symbol display positions which the collect has not visited). In another such embodiment, the gaming system displays certain symbol display positions and partially displays other symbol display positions. Such configurations provide that the structure of the path of symbol display positions and the symbols (and/or awards) at the different symbol display positions are unknown until the collector visits such symbol display positions and collects any associated symbols (and/or awards).

In another embodiment, for one or more of the path games disclosed herein, one or more of the symbols generated at one or more of the symbol display positions include shifting or variable symbols. In this embodiment, such shifting symbols change based on the occurrence of a symbol shift event, such as an elapsed amount of time, wherein the state of the shifting symbol when accumulated by the collector remains the state of the shifting symbol for any subsequent award determination. For example, while the gaming system displays a collector moving from symbol display position to symbol display position along the formed path, the gaming system modifies the value associated with a shifting symbol every three seconds. In this example, the gaming system modifies the value of the shifting symbol from a high value symbol to a medium value symbol and then three seconds later to a low value symbol and then three seconds later back to a high value symbol. In this example, the current value of the shifting symbol when and if that shifting symbol is accumulated is the value which the gaming system subsequently evaluates that shifting symbol at.

In another embodiment, for one or more of the path games disclosed herein, one or more of the symbols generated at one or more of the symbol display positions include power-up or enhancement symbols. In this embodiment, such power-up symbols, when accumulated by the collector, cause one or more events or features to occur. In different embodiments, the events or features triggered upon the accumulation of a power-up symbol include one or more of: modifications one or more previously accumulated symbols (e.g., the gaming system counts one or more previously accumulated symbols as accumulated twice), modifications of one or more subsequently accumulated symbols (e.g., the gaming system counts one or more subsequently accumulated symbols as accumulated three times), modifications to the quantity of symbol display positions a collector will visit (i.e., the gaming system extends the path of symbol display positions or the gaming system modifies the quantity of symbols displayed at one or more symbol display positions), an accumulation of one or more future game elements (e.g., the gaming system enables a collector to accumulate a key wherein while the collector's current path includes no locked doors, one or more of the collector's future paths include locked doors associated with the accumulated key), and/or modifications to a progressive award (i.e., the gaming system increments a progressive award when a power-up symbol is accumulated).

In another embodiment, for one or more of the path games disclosed herein, one or more of the symbols generated at one or more of the symbol display positions include path modification symbols. In this embodiment, when such path modification symbols are accumulated, the gaming system causes a modification to the path of symbol display positions. In one such embodiment, the accumulation of one or more of these path modification symbols causes another level of symbol display positions (or another matrix of symbol display positions) to become unlocked and available for the play of that path game. In another such embodiment, the accumulation of one or more of these path modification symbols causes one or more of the symbols displayed in one or more of the symbol display positions to move or shift a designated quantity of symbol display positions in a designated direction of movement. In another such embodiment wherein the path game includes one or more connectors which connects different levels of symbol display positions, the accumulation of one or more of these path modification symbols causes one or more of the connectors to shift a designated quantity of symbol display positions in a designated direction of movement. For example, if a collector accumulates a shift-left symbol (illustrated as a left arrow), the gaming system causes one or more connectors between symbol display position levels to shift one position to the left (if possible).

In another embodiment, for one or more of the path games disclosed herein, the gaming system forms the path of symbol display positions such that as the collector moves along the formed path, the collector visits the same symbol display position of the path more than once. In this embodiment, the gaming system provides a feature or event, such as a modifier, each additional time the collector visits the same symbol display position of the path.

In another embodiment, for one or more of the path games disclosed herein, the gaming system employs a plurality of collectors in association with the play of the path game. In one such embodiment, the plurality of collectors are associated with the same player wherein such collectors each accumulate symbols for the player. In another such embodiment, the plurality of collectors are associated with a plurality of different players. In one such embodiment, the plurality of collectors associated with the plurality of players cooperate to accumulate symbols for each of the players. In this embodiment, the gaming system determines a total path game award for each of the players based on the symbols accumulated by any of the collectors (i.e., the path game is a cooperative community game). In another such embodiment, if two or more collectors move to the same symbol display position at the same time, the gaming system applies a modifier to the symbol displayed at that symbol display position (and/or applies a modifier to one or more additional symbols displayed at additional symbol display positions which the two or more collectors subsequently move to together).

In another embodiment, for one or more of the path games disclosed herein, the plurality of collectors associated with the plurality of players compete to accumulate symbols. In this embodiment, the gaming system determines a total path game award for each of the players based on the individual symbols accumulated by that players collector(s) (i.e., the path game is a competitive community game). In another embodiment, the gaming system forms a plurality of different paths of symbol display positions and the different collectors follow the different paths to accumulate symbols for award determinations.

In another embodiment, for one or more of the path games disclosed herein employing a plurality of collectors, different collectors are associated with different attributes or characteristics. In one such embodiment, the different collectors are associated with different modifiers of any symbols accumulated by that collectors. In one such embodiment, different collectors move along the path of symbol display positions in different directions. For example, different collectors (which are associated with different modifiers) move in different directions wherein the first collector to reach a symbol displayed at a symbol display position of the path accumulates that symbol (and the gaming system applies that collector's modifier to the accumulated symbol) while the gaming system accumulates no symbols (or accumulates different symbols) for any subsequent collectors that reach the same symbol display position. In another such embodiment, the different collectors are associated with different abilities to move from symbol display position to symbol display position. For example, the gaming system causes a designated collector to move to a symbol display position off the formed path and accumulate any symbols displayed at such visited non-path symbol display positions.

In different embodiments, for one or more of the path games disclosed herein, the different collectors start at the same starting symbol display position or at one or more different starting symbol display positions. In one embodiment, each symbol generated at one or more of the symbol display positions is available to be accumulated by one of the plurality of collectors. In another embodiment, one or more symbols generated at one or more of the symbol display positions are available to be accumulated by a plurality of (or each) of the collectors.

In one embodiment, for one or more of the path games disclosed herein, the quantity of collectors moving to the symbol display positions of the path(s) determine one or more aspect of the path game. In one such embodiment, a path game played with one collector is associated with a higher volatility than a path game played with a plurality of collectors.

In another embodiment, for one or more of the path games disclosed herein, the gaming system determines any awards for the player based, at least in part, on the order or sequence which any symbols are accumulated. In one such embodiment, if the collector sequentially accumulates a designated quantity of the same symbol (or the same type of symbol) displayed at one or more of the symbol display positions of the path, the gaming system applies a modifier, such as a multiplier of 2×, to any award associated with the accumulation of this designated quantity of the same symbol.

In another embodiment, for one or more of the path games disclosed herein, the gaming system employs a plurality of symbol display position matrices for a play of the path game. In one such embodiment, the gaming system enables the player to pick which of the plurality of symbol display position matrices to employ in association with the play of the path game. In different embodiments, different symbol display position matrices are associated with different volatilities (i.e., different ranges of symbols and/or awards which populate the different symbol display positions of the matrix and/or different probabilities of populating such different symbol display positions of the matrix with such symbols and/or awards).

In another embodiment, for one or more of the path games disclosed herein, the gaming system enables the player to make one or more inputs regarding a direction of movement of a player's collector. In this embodiment, the path of symbol display positions includes one or more different routes or trails (i.e., branches in the path) wherein the gaming system enables the player to select which route or trail to proceed down. In one such embodiment, to increase certain player's level of excitement, the gaming system masks or otherwise does not fully display one or more of the symbols generated at one or more of the symbol display positions of the different available routes. In another such embodiment, the gaming system displays the symbols generated at one or more of the symbol display positions of the different available routes or trails, but the gaming system masks or otherwise does not fully display one or more award aspects of the different routes or trails. In another such embodiment, the gaming system employs a plurality of selectable routes or trails along the path of symbol display positions wherein the different routes or trails are associated with different types of awards or award opportunities. For example, a path of symbol display positions includes two branches, one branch associated with an amount of credits and another branch associated with a trigger of a bonus game, wherein the gaming system enables the player to pick which of the two branches the collector should follow.

In one embodiment, for one or more of the path games disclosed herein, the gaming system enables the player to make one or more inputs to determine one or more parameters or features of the path. In one such embodiment, the gaming system enables the player to make one or more inputs to determine a length of the path (i.e., a player determines, at least in part, a quantity of the symbol display positions of the path). In another such embodiment, the gaming system enables the player to make one or more inputs to determines one or more symbols (and/or awards) associated with one or more of the symbol display positions of the path.

In one embodiment, for one or more of the path games disclosed herein, the gaming system enables the player to pick the collector(s) utilized in association with the play of the path game. In one such embodiment, when a path game enrollment event occurs, the gaming system determines whether the player has previously enrolled to participate in the path game. In one such embodiment, a path game enrollment event occurs when a player submits (such as inserting) a player tracking card or inputs other identification into the gaming device. In another such embodiment, a path game enrollment event occurs when an unidentified player places a wager on a play of a primary game. In another such embodiment, a path game enrollment event occurs when a player begins play at a dedicated account based gaming device that is configured to play with a specific player.

In one embodiment, for one or more of the path games disclosed herein, if the player has not previously enrolled to participate in the path game, the gaming system enables the player to design or select one or more characteristics or icons of a collector (e.g., a player participant or avatar) associated with that player. For example, in designing a collector, the gaming system enables the player to select one or more of a gender, clothing, body characteristics or features, facial characteristics or features, and/or celebration sounds or catch-phrases. On the other hand, if the player has previously enrolled to participate in the path game, the gaming system accesses a previously designed collect associated with the player. In one such embodiment, if the player has obtained any virtual goods (from purchasing such virtual goods and/or winnings such virtual goods in association with one or more plays of one or more primary games and/or bonus games) or enhanced collector attributes (from purchasing such enhanced collector attributes and/or winnings such enhanced collector attributes in association with one or more plays of one or more primary games and/or bonus games), the gaming system enables the player to modify their existing designed collector with such virtual goods and/or such enhanced collector attributes.

In one embodiment, for one or more of the path games disclosed herein, the gaming system associates different collectors with different attributes. In one such embodiment, as mentioned above, different collectors are associated with different abilities to overcome or defeat different blocking symbols at the different symbol display positions. In this embodiment, the more attributes a collector acquires, the greater the collector's chances of defeating one or more blocking symbols and the greater the collector's chances of accumulated more symbols (i.e., more awards) for the player.

In one embodiment, for one or more of the path games disclosed herein, the gaming system causes at least one display device of the player's gaming device to display any of the path games disclosed herein. In another embodiment, in addition or in alternative to each gaming device displaying any of the path games disclosed herein, the gaming system causes one or more community or overhead display devices to display part or all of any of the path games disclosed herein to one or more other players or bystanders either at a gaming establishment or viewing over a network, such as the internet. In one such embodiment utilizing individual display devices and a community display device, a collector associated with a player which is accumulating symbols (and/or awards) on a player's individual display device accumulates such symbols (and/or awards) on the player's behalf. In this embodiment, a collector associated with a player which is accumulating symbols (and/or awards) on a community display device accumulates such symbols (and/or awards) on behalf of each of the players participating in a group path game.

In another embodiment, in addition or in alternative to each gaming device displaying any of the path games disclosed herein, the gaming system causes one or more internet sites to each display any of the path games disclosed herein such that a player is enabled to log on from a personal web browser. In another such embodiment, the gaming system enables the player to play one or more primary games on one device while viewing any of the path games disclosed herein from another device. For example, the gaming system enables the player to play one or more primary games on a mobile phone while viewing the status any of the path games disclosed herein on a desktop or laptop computer.

In another embodiment, as mentioned above, a path game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a path game triggering event to occur.

In another embodiment, as also mentioned above, the gaming system does not provide any apparent reasons to the players for a path game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, a path game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a path game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a path game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a path game triggering event occurs, based on a quantity of games played. In this embodiment, a quantity of games played is set for when one or more of such events or conditions will occur. In one embodiment, such a set quantity of games played is based on historic data.

In another alternative embodiment, a path game triggering event occurs, based on time. In this embodiment, a time is set for when one or more of such events or conditions will occur. In one embodiment, such a set time is based on historic data.

In another alternative embodiment, a path game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the players identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a path game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a path game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a path game triggering event to occur may be implemented in accordance with the gaming system and method disclosed herein.

It should be appreciated that any of the above-described path game triggering events may be combined in one or more different embodiments.

Alternative Embodiments

It should be appreciated that in different embodiments, one or more of:

i. a location of a starting symbol display position of a formed path;
ii. a location of an ending symbol display position of a formed path;
iii. a quantity of symbol display positions in a matrix;
iv. which of a plurality of different symbol display matrices to employ;
v. a quantity of symbol display positions in a formed path;
vi. a shape or configuration of the path of symbol display positions;
vii. which symbol display positions are associated with which symbols (and/or awards);
viii. a quantity of symbols (and/or awards) to associate with a symbol display position;
ix. a quantity of symbols (and/or awards) to accumulate from a plurality of symbols (and/or awards) associated with a symbol display position;
x. a quantity of connectors utilized to form a displayed path;
xi. a quantity of collectors associated with a formed displayed path;
xii. an attribute of one or more collectors associated with a formed displayed path;
xiii. the starting position and/or ending position of one or more connectors;
xiv. which collector movement rule to employ to determine a direction of movement of one or more collectors;
xv. a direction of movement along a path of one or more collectors;
xvi. which symbols (and/or awards) are displayed at which symbol display positions;
xvii. which symbols (and/or awards) are masked or partially displayed at which symbol display positions;
xviii. a quantity of shifting symbols to utilize;
xix. which symbol display positions are associated with shifting symbols;
xx. a quantity of power-up symbols to utilize;
xxi. which symbol display positions are associated with power-up symbols;
xxii. a quantity of path modification symbols to utilize;
xxiii. which symbol display positions are associated with path modification symbols;
xxiv. a quantity of terminator symbols to utilize;
xxv. which symbol display positions are associated with terminator symbols;
xxvi. a quantity of blocking symbols to utilize;
xxvii. which symbol display positions are associated with blocking symbols;
xxviii. a determination of if a collector is blocked by (or moves past) a blocking symbol;
xxix. any movement of any blocking symbols;
xxx. when a block symbol path blocking event occurs;
xxxi. when a path game enrollment event occurs;
xxxii. which enhanced collector attributes to associated with one or more collectors;
xxxiii. a quantity of symbol display positions to add to a starting symbol display position if a formed path does not connect the starting symbol display position with an ending symbol display position;
xxxiv. a quantity of symbol display positions to add to an ending symbol display position if a formed path does not connect a starting symbol display position with the ending symbol display position;
xxxv. a determination of whether to determine any awards based on a quantity of symbol display positions in a modified starting symbol display position;

xxxvi. a determination of whether to determine any awards based on a quantity of symbol display positions in a modified ending symbol display position;

xxxvii. a speed which to move the collector through the path;

xxxviii. whether to enable a player to make any inputs to determine a direction of movement of a collector through the path;

xxxix. whether to enable a player to make any inputs to change the direction of movement of the collector through the path; and xl. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 7A:
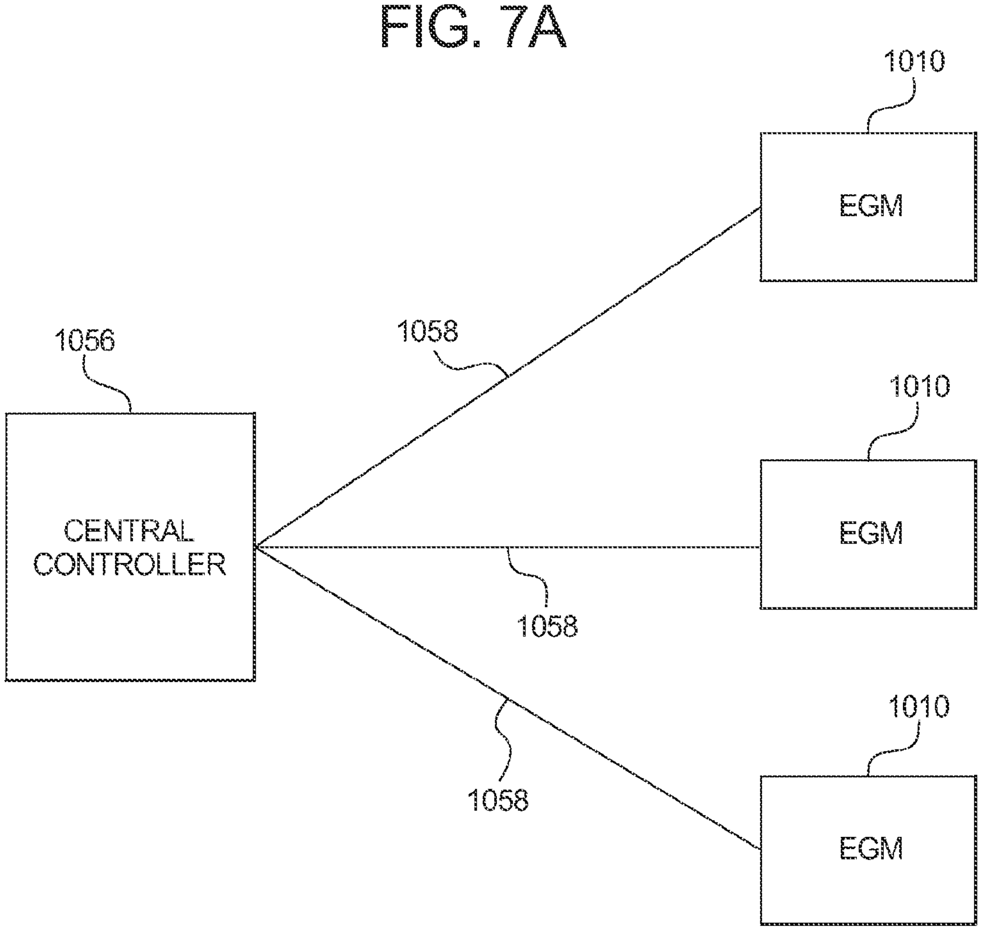
FIG. 7A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 7A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 7B:
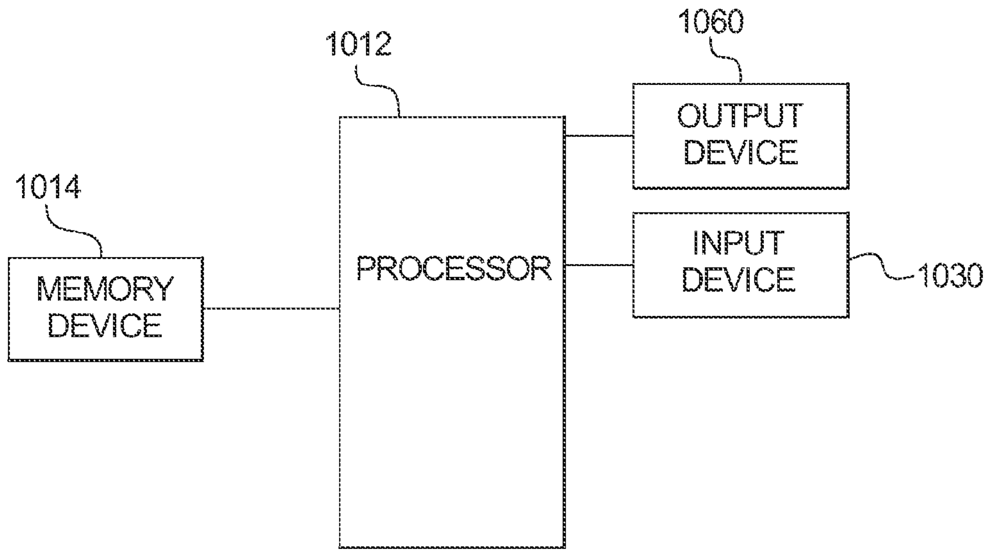
FIG. 7B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 7B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 7B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 8A:
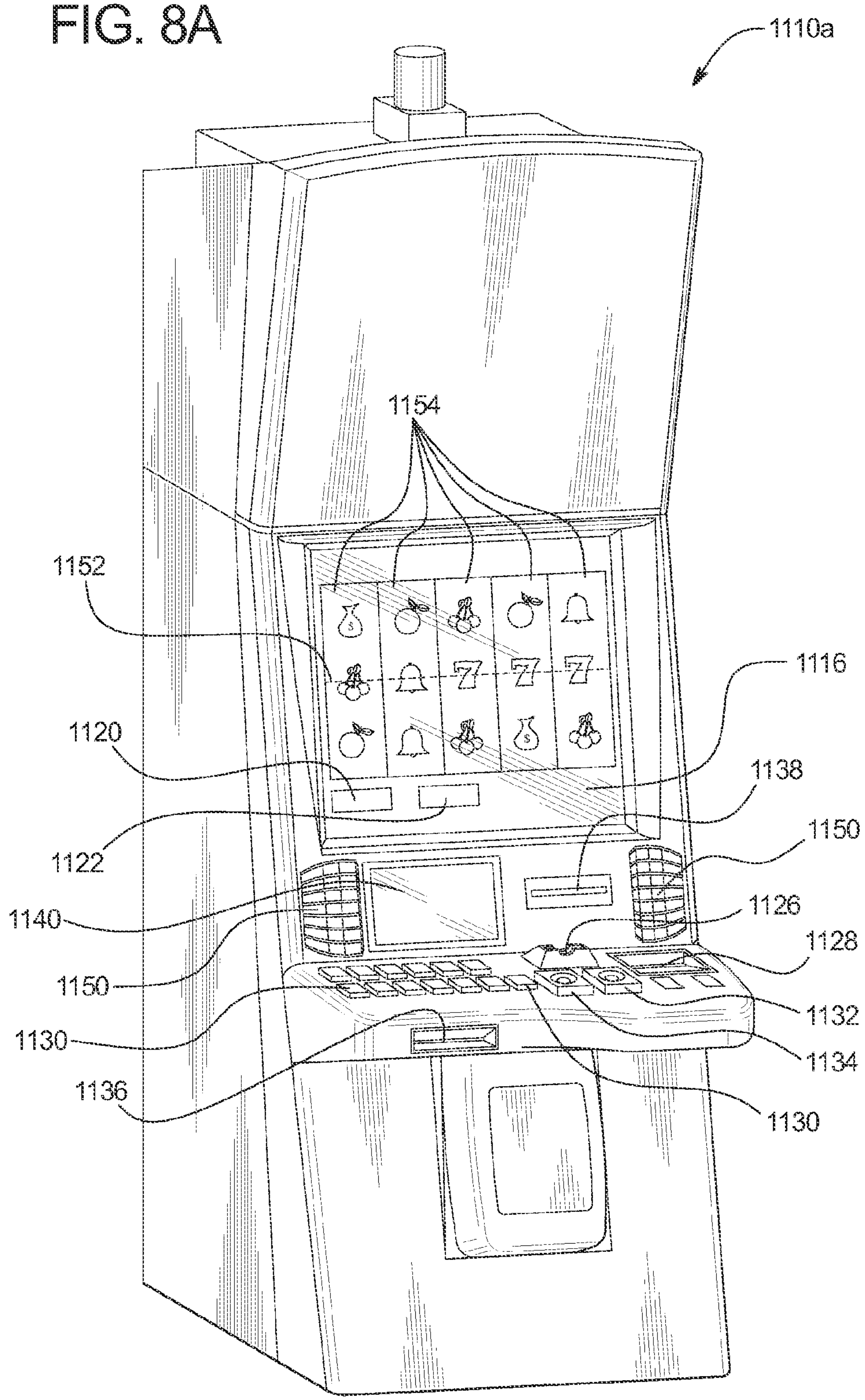
FIGS. 8A and 8B are perspective views of example alternative embodiments of the gaming system disclosed herein.
Figure 8B:
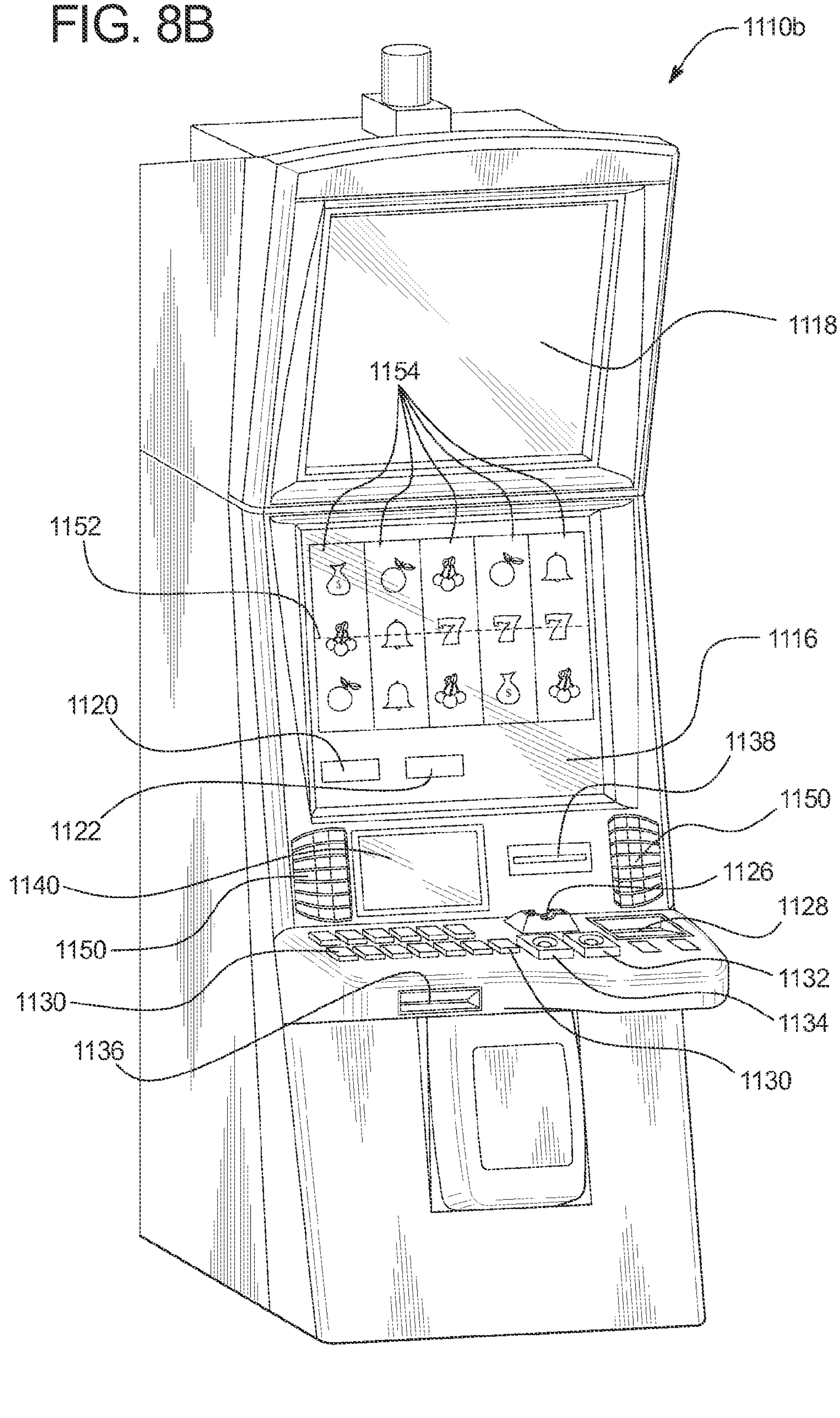

In various embodiments, the EGM includes one or more input devices. The input devices may include any suitable device that enables an input signal to be produced and received by the at least one processor of the EGM. The example EGM illustrated in FIG. 7B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 8A and 8B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 8A and 8B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 8A and 8B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 8A and 8B each include a card reader 1138. The card reader is configured to read a player identification card inserted into the card reader.

In various embodiments, the EGM includes one or more output devices. The example EGM illustrated in FIG. 7B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 8A includes a central display device 1116, a player tracking display 1140, a credit display 1120, and a bet display 1122. The example EGM illustrated in FIG. 8B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 8A and 8B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 8A and 8B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 8A and 83, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 8A and 8B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 8A and 8B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified players gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a plurality of adjacent symbol display positions, (b) randomly generate one of a plurality of symbols at a plurality of the adjacent symbol display positions, (c) randomly select a quantity of at least two of the adjacent symbol display positions, wherein said random selection of the quantity of at least two of the adjacent symbol display positions occurs prior to any display of any path formed by said at least two adjacent symbol display positions, (d) after randomly selecting the quantity of at least two of the adjacent symbol display positions, display a path formed by said selected quantity of at least two of the adjacent symbol display positions, (e) accumulate each of the symbols generated at each of the randomly selected symbol display positions of the formed path, (f) determine if any awards are associated with the accumulated symbols, and (g) display any determined awards associated with the accumulated symbols.

2. The gaming system of claim 1, wherein when executed by the at least one processor for a first play of a game, the plurality of instructions cause the at least one processor to randomly select a first quantity of the symbol display positions and when executed by the at least one processor for a second play of the game, the plurality of instructions cause the at least one processor to randomly select a second, different quantity of the symbol display positions.

3. The gaming system of claim 2, wherein the first play of the game is associated with a first probability of displaying any determined awards associated with the accumulated symbols and the second play of the game is associated with a second, different probability of displaying any determined awards associated with the accumulated symbols.

4. The gaming system of claim 1, wherein the formed path of symbol display positions includes a starting symbol display position and an ending symbol display position.

5. The gaming system of claim 4, wherein when executed by the at least one processor, the plurality of instructions cause the at least one processor to randomly determine at least one of: the starting symbol display position and the ending symbol display position.

6. The gaming system of claim 4, wherein when executed by the at least one processor, the plurality of instructions cause the at least one processor to display at least one collector moving from the starting symbol display position through each of the selected quantity of adjacent symbol display positions of the formed path to the ending symbol display position.

7. The gaming system of claim 6, wherein when executed by the at least one processor, the plurality of instructions cause the at least one processor to display a distinct collector associated with each of a plurality of players.

8. The gaming system of claim 4, wherein when executed by the at least one processor, the plurality of instructions cause the at least one processor to display at least two collectors moving along the symbol display positions of the path in different directions.

9. The gaming system of claim 8, wherein the at least two collectors have different attributes.

10. The gaming system of claim 9, wherein the attribute associated with at least one of the collectors causes an expansion of the quantity of symbol display positions of the path.

11. The gaming system of claim 1, wherein when executed by the at least one processor, the plurality of instructions cause the at least one processor to randomly generate one of the plurality of symbols at each of the adjacent symbol display positions.

12. The gaming system of claim 1, wherein when executed by the at least one processor, the plurality of instructions cause the at least one processor to randomly determine, for each of a plurality of said symbol display positions, whether to include said symbol display position in said formed path.

13. A method of operating a gaming system, said method comprising:

(a) causing at least one display device to display a plurality of adjacent symbol display positions, (b) causing at least one processor to execute a plurality of instructions to randomly generate one of a plurality of symbols at a plurality of the adjacent symbol display positions, (c) causing the at least one processor to execute the plurality of instructions to randomly select a quantity of at least two of the adjacent symbol display positions, wherein said random selection of the quantity of at least two of the adjacent symbol display positions occurs prior to any display of any path formed by said at least two adjacent symbol display positions, (d) after randomly selecting the quantity of at least two of the adjacent symbol display positions, causing the at least one display device to display a path formed by said selected quantity of at least two of the adjacent symbol display positions, (e) causing the at least one processor to execute the plurality of instructions to accumulate each of the symbols generated at each of the randomly selected symbol display positions of the formed path, (f) causing the at least one processor to execute the plurality of instructions to determine if any awards are associated with the accumulated symbols, and (g) causing the at least one display device to display any determined awards associated with the accumulated symbols.

14. The method of claim 13, which includes:

for a first play of a game, causing the at least one processor to execute the plurality of instructions to randomly select a first quantity of the symbol display positions, and for a second play of the game, causing the at least one processor to execute the plurality of instructions to randomly select a second, different quantity of the symbol display positions.

15. The method of claim 14, wherein the first play of the game is associated with a first probability of displaying any determined awards associated with the accumulated symbols and the second play of the game is associated with a second, different probability of displaying any determined awards associated with the accumulated symbols.

16. The method of claim 13, wherein the formed path of symbol display positions includes a starting symbol display position and an ending symbol display position.

17. The method of claim 16, which includes causing the at least one processor to execute the plurality of instructions to randomly determine at least one of: the starting symbol display position and the ending symbol display position.

18. The method of claim 16, which includes causing the at least one display device to display at least one collector moving from the starting symbol display position through each of the selected quantity of adjacent symbol display positions of the formed path to the ending symbol display position.

19. The method of claim 18, which includes causing the at least one display device to display a distinct collector associated with each of a plurality of players.

20. The method of claim 16, which includes causing the at least one display device to display at least two collectors moving along the symbol display positions of the path in different directions.

21. The method of claim 20, wherein the at least two collectors have different attributes.

22. The method of claim 21, wherein the attribute associated with at least one of the collectors causes an expansion of the quantity of symbol display positions of the path.

23. The method of claim 13, which includes causing the at least one processor to execute the plurality of instructions to randomly generate one of the plurality of symbols at each of the adjacent symbol display positions.

24. The method of claim 13, which includes causing the at least one processor to execute the plurality of instructions to randomly determine, for each of a plurality of said symbol display positions, whether to include said symbol display position in said formed path.

25. The method of claim 13, which is provided through a data network.

26. The method of claim 25, wherein the data network is an internet.

27. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a plurality of adjacent symbol display positions including a plurality of levels of symbol display positions, (b) randomly generate one of a plurality of symbols at a plurality of the adjacent symbol display positions, (c) for each level of symbol display positions, randomly select which of the symbol display positions of that level to connect to which of any symbol display positions of any subsequent level to form a path of symbol display positions, (d) display said formed path of symbol display positions, (e) accumulate each of the symbols generated at each of the randomly selected symbol display positions of the formed path, (f) determine if any awards are associated with the accumulated symbols, and (g) display any determined awards associated with the accumulated symbols.

28. A method of operating a gaming system, said method comprising:

(a) causing at least one display device to display a plurality of adjacent symbol display positions including a plurality of levels of symbol display positions, (b) causing at least one processor to execute a plurality of instructions to randomly generate one of a plurality of symbols at a plurality of the adjacent symbol display positions, (c) for each level of symbol display positions, causing the at least one processor to execute the plurality of instructions to randomly select which of the symbol display positions of that level to connect to which of any symbol display positions of any subsequent level to form a path of symbol display positions, (d) causing the at least one display device to display said formed path of symbol display positions, (e) causing the at least one processor to execute the plurality of instructions to accumulate each of the symbols generated at each of the randomly selected symbol display positions of the formed path, (f) causing the at least one processor to execute the plurality of instructions to determine if any awards are associated with the accumulated symbols, and (g) causing the at least one display device to display any determined awards associated with the accumulated symbols.

29. The method of claim 28, which is provided through a data network.

30. The method of claim 29, wherein the data network is an internet.

* * * * *